(12) United States Patent
Masters et al.

(10) Patent No.: US 7,934,888 B2
(45) Date of Patent: May 3, 2011

(54) MARINE ANTI-FOULANT SYSTEM AND METHODS FOR USING SAME

(75) Inventors: Rodney H. Masters, Houston, TX (US); Billy L. Griffith, Houston, TX (US)

(73) Assignee: VIV Suppression, Inc., Houston, TX (US)

( * ) Notice: Subject to any disclaimer, the term of this patent is extended or adjusted under 35 U.S.C. 154(b) by 440 days.

(21) Appl. No.: 12/016,249

(22) Filed: Jan. 18, 2008

(65) Prior Publication Data
US 2009/0185867 A1    Jul. 23, 2009

(51) Int. Cl.
*E02D 5/60* (2006.01)
*F15D 1/10* (2006.01)
(52) U.S. Cl. ........................................ 405/216
(58) Field of Classification Search .......... 405/211–216; 114/243
See application file for complete search history.

(56) References Cited

U.S. PATENT DOCUMENTS

| | | | |
|---|---|---|---|
| 3,661,506 A * | 5/1972 | Watkins | ............................ 422/6 |
| 4,314,851 A | 2/1982 | ogly Shakhtakhtinsky et al. | |
| 4,329,277 A | 5/1982 | Murphy | |
| 4,375,199 A | 3/1983 | Graeme-Barber et al. | |
| 4,398,487 A | 8/1983 | Ortloff et al. | |
| 4,415,293 A * | 11/1983 | Engel et al. | ................... 205/732 |
| 4,474,129 A | 10/1984 | Watkins et al. | |
| 4,603,653 A | 8/1986 | Bews | |
| 4,947,785 A | 8/1990 | Milne | |
| 4,987,036 A | 1/1991 | Miller | |
| 5,017,322 A | 5/1991 | Brooks | |
| 5,192,603 A | 3/1993 | Slater et al. | |
| 5,226,380 A | 7/1993 | Fischer | |
| 5,284,682 A | 2/1994 | Martin | |
| 5,331,074 A | 7/1994 | Slater et al. | |
| 5,358,589 A | 10/1994 | Inoue | |
| 5,377,763 A | 1/1995 | Pearce et al. | |
| 5,410,979 A | 5/1995 | Allen et al. | |
| 5,518,342 A * | 5/1996 | Wright et al. | ................. 405/211 |
| 5,722,340 A | 3/1998 | Sweetman | |

(Continued)

FOREIGN PATENT DOCUMENTS

EP    1604062    12/1981

(Continued)

OTHER PUBLICATIONS

Anderson, Colin D. "TBT Free Antifoulings and Foul Release Systems." www.international-marine.com/antifoulings/TBT.

*Primary Examiner* — Sunil Singh
(74) *Attorney, Agent, or Firm* — Edmonds & Nolte, P.C.

(57) ABSTRACT

Systems and methods for reducing vortex-induced vibration and drag about a marine element are provided. The system can include, but is not limited to, a shell rotatably mounted about the marine element, the shell having opposing edges defining a longitudinal gap configured to allow the shell to snap (be placed) around at least a portion of the marine element. A fin can be positioned along each opposing edge of the longitudinal gap, wherein each fin can extend outwardly from the shell. The fins can be positioned on the shell so as to reduce vortex-induced vibration and minimize drag on the marine element. One or more antifouling agents can be disposed on, in, or about at least a portion of the shell, the fins, or a combination thereof.

23 Claims, 3 Drawing Sheets

U.S. PATENT DOCUMENTS

| | | | |
|---|---|---|---|
| 5,769,019 | A | 6/1998 | Dias da Silva |
| 5,814,172 | A | 9/1998 | Cox et al. |
| 5,820,737 | A | 10/1998 | Kohn |
| 5,861,435 | A | 1/1999 | Yokoi et al. |
| 6,010,278 | A | 1/2000 | Denison et al. |
| 6,067,922 | A | 5/2000 | Denison et al. |
| 6,223,672 | B1 | 5/2001 | Allen et al. |
| 6,248,806 | B1 | 6/2001 | Codolar et al. |
| 6,401,646 | B1 | 6/2002 | Masters et al. |
| 6,436,421 | B1 | 8/2002 | Schindler et al. |
| 6,514,401 | B2 | 2/2003 | Chyou et al. |
| 6,559,202 | B1 | 5/2003 | Fox et al. |
| 6,565,287 | B2 | 5/2003 | McMillan et al. |
| 6,607,826 | B1 | 8/2003 | Hatch |
| 6,635,692 | B1 | 10/2003 | Christie et al. |
| 6,685,394 | B1 | 2/2004 | Allen et al. |
| 6,710,117 | B2 | 3/2004 | Gillard et al. |
| 7,022,750 | B2 | 4/2006 | Camp et al. |
| 7,041,285 | B2 | 5/2006 | Polsenski et al. |
| 7,087,106 | B2 | 8/2006 | Kem et al. |
| 7,147,921 | B2 | 12/2006 | Camp et al. |
| 7,234,407 | B1 | 6/2007 | Levine et al. |
| 7,244,295 | B2 | 7/2007 | Detty et al. |
| 7,600,945 | B2 * | 10/2009 | Burgess .................. 405/216 |

FOREIGN PATENT DOCUMENTS

| | | |
|---|---|---|
| JP | 2001114185 A * | 4/2001 |
| WO | WO/00/34291 | 6/2000 |
| WO | WO 02/32755 A1 | 4/2002 |

* cited by examiner

MARINE ANTI-FOULANT SYSTEM AND METHODS FOR USING SAME

BACKGROUND OF THE INVENTION

1. Field of the Invention

Embodiments of the present invention generally relate to systems and methods for protecting marine surfaces against biological fouling. More particularly, embodiments relate to systems and methods for reducing biological fouling on vortex-induced vibration reduction devices for offshore hydrocarbon exploration and production.

2. Description of the Related Art

In off-shore operations, vortex-induced vibration or "VIV" is caused by the flow of water around a tubular, such as a riser or other marine element. The flow of water leads to the shedding of vortices which cause alternating forces on either side of the marine element, thereby causing the element to vibrate. When the frequency of the shedding vortices is at or near the natural frequency of the marine element, resonance occurs which can cause potentially destructive levels of vibration that adversely affect the platform structure itself, in addition to the equipment and personnel on the platform.

To counteract VIV, systems to divert or absorb the vibrational energy of the water have been used, such as fairings, strakes, and shrouds. VIV reduction devices generally reduce vortex-induced forces and minimize drag on the riser by reducing or breaking up the low pressure areas that form down-current of the riser. However, marine environments must overcome the additional challenge of biological fouling or "biofouling."

Biofouling is the undesirable accumulation of microorganisms, plants, algae, and other organisms on marine structures. There are two categories of biofouling: microfouling, which is the formation of biofilms and bacterial adhesion and macrofouling, which is the attachment of larger organisms, such as barnacles, mussels, polychaete worms, bryozoans, and seaweed. This build up of organisms on the surface of marine elements increases the weight and size of the VIV reduction devices, which in turn increases vortex-induced vibrations and drag forces exerted on the fairings. Furthermore, biofouling can prevent a VIV reduction device, such as fairings from rotating or weathervaning about the marine element.

There is a need, therefore, for systems and methods for reducing VIV and drag forces with vortex-induced vibration reduction devices while also reducing or preventing biofouling.

SUMMARY OF THE INVENTION

Systems and methods for reducing vortex-induced vibration and drag about a marine element are provided. In at least one specific embodiment, the system can include, but is not limited to, a shell rotatably mounted about the marine element, the shell having opposing edges defining a longitudinal gap configured to allow the shell to snap (be placed) around the marine element. A fin can be positioned along each opposing edge of the longitudinal gap wherein each fin can extend outwardly from the shell. The fins can be positioned on the shell so as to reduce vortex-induced vibration and minimize drag on the marine element. One or more antifouling agents can be disposed on, in, or about at least a portion of the shell, the fins, or a combination thereof.

In at least one specific embodiment, the method for reducing vortex-induced vibration and minimizing drag about a marine element can include disposing a vortex-induced vibration reduction device about a marine element. The vortex-induced vibration reduction device can include a rotatable shell. The rotatable shell can have opposing edges defining a longitudinal gap configured to allow the shell to snap around the marine element. A fin can be positioned along each opposing edge of the longitudinal gap, wherein each fin can extend outwardly from the shell. The fins can be positioned on the shell so as to reduce vortex-induced vibration and minimize drag on the marine element. One or more antifouling agents can be disposed on, in, or about at least a portion of the shell, the fin, or both.

In at least one specific embodiment, the method for reducing vortex-induced vibration and minimizing drag about a marine element can include disposing a vortex-induced vibration reduction device about a marine element. The vortex-induced vibration reduction device can include a U-shaped cylindrical shell with opposing edges defining a longitudinal gap. Parallel fins can extend outwardly from the opposing edges of the shell. The parallel fins can be positioned so as to reduce vortex-induced vibration and minimize drag on the marine element. One or more antifouling agents can be disposed on, in, or about at least a portion of the shell, the fins, or both.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
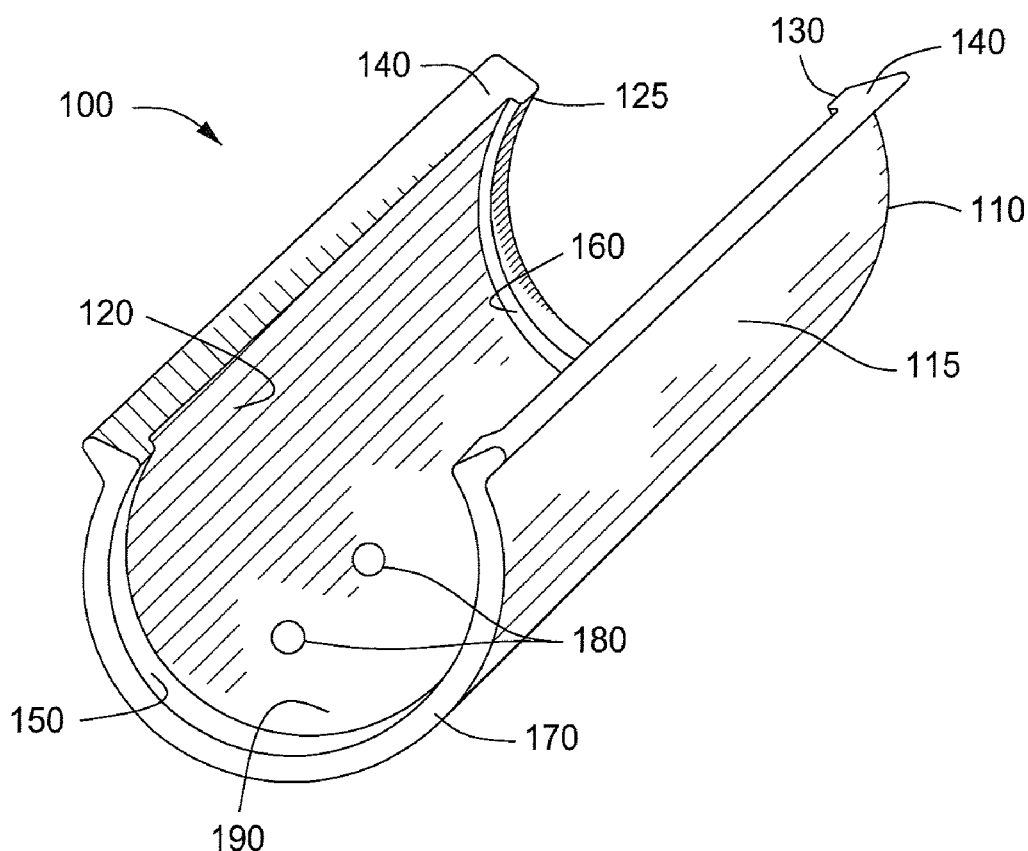
FIG. 1 depicts a schematic of an illustrative vortex-induced vibration reduction device according to one or more embodiments described.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Antifouling agents can reduce or prevent the growth of marine organisms on a marine surface, such as a VIV reduction device system. VIV reduction devices can include fairings, strakes, shrouds, or any combination thereof. VIV reduction devices can reduce vortex-induced vibrations and drag forces.

The one or more antifouling agents ("antifoulants") can be biocidal, foul release, or both. Illustrative, biocidal antifouling agents can be a metal or metallic/non-metallic compound that is poisonous to marine organisms, which thereby prevent or reduce the ability of marine organisms to survive. Illustrative foul release antifouling agents can be silicone or fluoropolymer based materials which can provide a smooth surface to which marine organisms cannot attach.

Marine organisms can be "soft fouling organisms," which can include plants and invertebrates, such as slime, algae, kelp, soft corals, tunicates, hydroids, sponges and anemones; or "hard fouling organisms," which can include invertebrates having some type of hard outer shell, such as barnacles, tubeworms and molluscs.

The antifouling agent can be a metal or metal alloy. The metal or metal alloy can include any one or more metals from groups Ib, IIa, IIb, IIIa, IIIb, IVa, IVb, Va, Vb, VIb, VIIb, and VIII of the Periodic Table of Elements. The antifouling agent can include, but is not limited to copper, nickel, palladium, platinum, tantalum, tellurium, titanium, beryllium, magnesium, manganese, calcium, silver, gold, zinc, cadmium, mercury, boron, aluminum, molybdenum, scandium, yttrium, silicon, zirconium, tin, arsenic, alloys thereof, and combinations thereof. The metal alloy can be or include, for example, copper-nickel alloy, copper-beryllium alloy, beryllium-cobalt-copper alloy, beryllium-cobalt-silicon-copper alloy, or combinations thereof.

The antifouling agent can be or include inorganic compounds. The antifouling agent can be or include oxides, carbonates, halides, hydroxides, cyanides, nitrates, nitrites, nitrides, sulfates, sulfites, sulfides, or combinations thereof of a metal or metal alloy. In one or more embodiments, the antifouling agent can be or include, oxides, carbonates, halides, hydroxides, cyanides, nitrates, nitrites, nitrides, sulfates, sulfites, or sulfides of copper, nickel, palladium, platinum, tantalum, tellurium, titanium, beryllium, magnesium, manganese, calcium, silver, gold, zinc, cadmium, mercury, boron, aluminum, molybdenum, scandium, yttrium, silicon, zirconium, tin, arsenic, lead, oxides thereof, alloys thereof, and combinations thereof.

The antifouling agent can be or include products of reaction between a metal or metal compound and a resin acid. The resin acid can be or include abietic acid, pimaric acid, neoabietic acid, dehydroabietic acid, palustric acid, levopimaric acid, isopimaric acids, derivatives thereof, and mixtures thereof. For example, the antifouling agent can be or include products of reaction between copper or a copper compound and rosin, or products of reaction between tin or a tin compound and rosin.

The antifouling agent can be or include organotmetallic compounds. The antifouling agent can be or include organo-tin compounds. In one or more embodiments, the organotin compounds can include, but are not limited to a trialkyl tin, triaryl tin, or both. Illustrative examples of organotin compounds can be or include bistributyl tin oxide, tributyl tin chloride, tributyl tin fluoride, tributyl tin acetate, tributyl tin nicotinate, tributyl tin versatate, bistributyl tin, triphenyl tin hydroxide, bistriphenyl tin α,α'-dibromosuccinate, bistriphenyl tin oxide, bistryphenyl tin monochloromaleinate, and other organo tin compounds.

The antifouling agent can be or include organo-copper compounds. In one or more embodiments, the organo-copper compounds can include, but are not limited to copper acetate, oxine copper, copper nonylphenolsulfonate, copper bis(ethylenediamine)-bis(dodecylbenzenesulfonate), copper naphthenate, copper bis(pentachlorophenolate), copper pyrithione, copper naphtenate, and derivatives thereof.

The antifouling agent can be or include other organo-metallic compounds, which can include, but are not limited to organo-nickel compounds, such as nickel acetate and nickel dimethyldithiocarbamate; organo-zinc compounds, such as zinc acetate, zinc carbamate, bis(dimethylcarbamoyl) zinc ethylene-bis(dithiocarbamate), zinc dimethyldithiocarbamate, zinc pyrithione, and zinc ethylene-bis(dithiocarbamate); and mixed metal-containing organic compounds such as (polymeric) manganese ethylene bis dithiocarbamate complexed with zinc salt (mancozeb), and derivatives thereof.

The antifouling agent can be or include α,α'-dibromosuccinate; biocidal metal carboxylates such as copper naphthenate or copper stearate; metal (e.g. Na, K, Zn, Pb, Cu, Fe, Ni, Mg, Se) dialkyl dithiocarbamates such as zinc dimethyl dithiocarbamate and thiuram disulfide; sulfamides such as phthalylsulfathiazole, sulfaethydrole, sulfanilidopyridine or sulfamethoxyine; pyrrole and imidazole compounds such as glyodine, fentizole or polycide; thioxane and thioxanthone compounds such as terazol, asterol or mylone; amides such as nicarbazin, 3,4,5-tribromosalicylanilide, N-trichloromethylmercaptophthalimide or 3,5-dinitrobenzamide; polyhexamethyleneguanidine salts; and derivatives thereof.

The antifouling agent can be or include a metal-free organic compound, such as N-trihalomethylthiophthalimides, trihalomethylthiosulphamides, dithiocarbamic acids, N-arylmaleimides, 3-(substituted amino)-1,3 thiazolidine-2,4-diones, dithiocyano compounds, triazine compounds, oxathiazines, 2,4,5,6-tetrachloroisophthalonitrile, N,N-dimethyl-dichlorophenylurea, 4,5-dichloro-2-n-octyl-4-isothiazoline-3-one, N,N-dimethyl-N'-phenyl-(N-fluorodichloromethylthio)-sulfamide, tetramethylthiuramdisulphide, 3-iodo-2-propinylbutyl carbamate, 2-(methoxycarbonylamino) benzimidazole, 2,3,5,6-tetrachloro-4-(methylsulphonyl) pyridine, diiodomethyl-p-tolyl sulphone, phenyl (bispyridine)bismuth dichloride, 2-(4-thiazolyl) benzimidazole, dihydroabietyl amine, N-methylol formamide and pyridine triphenylborane, and others.

The antifouling agent be or include one or more pesticides. The pesticide can be or include one or more fungicides, herbicides, insecticides, algicides, molluscicides, bacteriocides, or combinations thereof. The fungicide can be or include aliphatic nitrogen fungicides, such as butylamine, cymoxanil, dodicin, dodine, guazatine, and iminoctadine; amide fungicides, such as bixafen, carpropamid, chloraniformethan, cyflufenamid, diclocymet, ethaboxam, fenoxanil, flumetover, furametpyr, mandipropamid, penthiopyrad, prochloraz, quinazamid, silthiofam and triforine; acylamino acid fungicides, such as benalaxyl, benalaxyl-M, furalaxyl, metalaxyl, metalaxyl-M and pefurazoate; anilide fungicides, such as benalaxyl, benalaxyl-M, boscalid, carboxin, fenhexamid, isotianil, metalaxyl, metalaxyl-M, metsulfovax, ofurace, oxadixyl, oxycarboxin, pyracarbolid, thifluzamide and tiadinil; benzanilide fungicides, such as benodanil, flutolanil, mebenil, mepronil, salicylanilide and tecloftalam; furanilide fungicides, such as fenfuram, furalaxyl, furcarbanil and methfuroxam; sulfonanilide fungicides, such as flusulfamide; benzamide fungicides, such as benzohydroxamic acid, fluopicolide, fluopyram, tioxymid, trichlamide, zarilamid, zoxamide; furamide fungicides, such as cyclafuramid and furmecyclox; phenylsulfamide fungicides, such as dichlofluanid and tolylfluanid; sulfonamide fungicides amisulbrom and cyazofamid; valinamide fungicides, such as benthiavalicarb and iprovalicarb; antibiotic fungicides, such as aureofungin, blasticidin-S, cycloheximide, griseofulvin, kasugamycin, natamycin, polyoxins, polyoxorim, streptomycin and validamycin; strobilurin fungicides, such as azoxystrobin, dimoxystrobin, fluoxastrobin. kresoxim-methyl, metominostrobin, orysastrobin, picoxystrobin, pyraclostrobin and trifloxystrobin; aromatic fungicides, such as biphenyl, chlorodinitronaphthalene, chloroneb, chlorothalonil, cresol, dicloran, hexachlorobenzene, pentachlorophenol, quintozene, sodium pentachlorophenoxide and tecnazene; benzimidazole fungicides, such as benomyl, carbendazim, chlorfenazole, cypendazole, debacarb, fuberidazole, mecarbinzid, rabenzazole and thiabendazole; benzimidazole precursor fungicides, such as furophanate, thiophanate and thiophanate-methyl; benzothiazole fungicides, such as bentaluron, chlobenthiazone and TCMTB; bridged diphenyl fungicides, such as bithionol, dichlorophen and diphenylamine; carbamate fungicides, such as benthiavalicarb, furophanate, iprovalicarb, propamocarb, pyraclostrobin, pyribencarb, thiophanate and thiophanate-methyl; benzimidazolylcarbamate fungicides, such as benomyl, carbendazim, cypendazole, debacarb and mecarbinzid; carbanilate fungicides, such as diethofencarb; conazole fungicides (imidazoles), such as climbazole, clotrimazole, imazalil, oxpoconazole, prochloraz, and triflumizole; conazole fungicides (triazoles), such as azaconazole, bromuconazole, cyproconazole, diclobutrazol, difenoconazole, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, penconazole, propiconazole, prothioconazole, quinconazole, simeconazole, tebuconazole, tetraconazole, triadimefon, triadimenol, triticonazole, uniconazole and uniconazole-P; copper fungicides, such as Bordeaux mixture, Burgundy mixture, Cheshunt mixture, copper acetate, copper carbonate, basic, copper hydroxide, copper naphthenate, copper oleate, copper oxychloride, copper silicate, copper sulfate, copper sulfate, basic copper zinc, chromate, cufraneb, cuprobam, cuprous oxide, mancopper, and oxine-copper; dicarboximide fungicides, such as famoxadone and fluoroimide; dichlorophenyl dicarboximide fungicides, such as chlozolinate, dichlozoline, iprodione, isovaledione, myclozolin, procymidone and vinclozolin; phthalimide fungicides, such as captafol, captan, ditalimfos, folpet and thiochlorfenphim; dinitrophenol fungicides, such as binapacryl, dinobuton, dinocap, dinocap-4, dinocap-6, meptyldinocap, dinocton, dinopenton, dinosulfon, dinoterbon and DNOC; dithiocarbamate fungicides, such as azithiram, carbamorph, cufraneb, cuprobam, disulfuram, ferbam, metam, nabam, tecoram, thiram and ziram; cyclic dithiocarbamate fungicides, such as dazomet, etem and milneb; polymeric dithiocarbamate fungicides, such as mancopper, mancozeb, maneb, metiram, polycarbamate, propineb and zineb; imidazole fungicides, such as cyazofamid, fenamidone, fenapanil, glyodin, iprodione, isovaledione, pefurazoate and triazoxide; inorganic fungicides, such as potassium azide, potassium thiocyanate, sodium azide and sulfur; mercury fungicides, such as mercuric chloride, mercuric oxide and mercurous chloride; organomercury fungicides, such as (3-ethoxypropyl)mercury bromide, ethylmercury acetate, ethylmercury bromide, ethylmercury chloride, ethylmercury 2,3-dihydroxypropyl mercaptide ethylmercury phosphate, N-(ethylmercury)-p-toluenesulphonanilide, hydrargaphen, 2-methoxyethylmercury chloride, methylmercury benzoate, methylmercury, icyandiamide, methylmercury pentachlorophenoxide, 8-phenylmercurioxyquinoline, phenylmercuriurea, phenylmercury acetate, phenylmercury chloride, phenylmercury derivative of pyrocatechol, phenylmercury nitrate, phenylmercury salicylate, thiomersal and tolylmercury acetate; morpholine fungicides, such as aldimorph, benzamorf, carbamorph, dimethomorph, dodemorph, fenpropimorph, flumorph and tridemorph; organophosphorus fungicides, such as ampropylfos, ditalimfos, edifenphos, fosetyl, hexylthiofos, iprobenfos, phosdiphen, pyrazophos, tolclofos-methyl and triamiphos; organotin fungicides, such as decafentin and fentin, tributyltin oxide; oxathiin fungicides, such as carboxin and oxycarboxin; oxazole fungicides, such as chlozolinate, dichlozoline, drazoxolon, famoxadone, hymexazol, metazoxolon, myclozolin, oxadixyl and vinclozolin; polysulfide fungicides, such as barium polysulfide, calcium polysulfide, potassium polysulfide and sodium polysulfide; pyrazole fungicides, such as bixafen, furametpyr, penthiopyrad, pyraclostrobin and rabenzazole; pyridine fungicides, such as boscalid, buthiobate, dipyrithione, fluazinam, fluopicolide, fluopyram, pyribencarb, pyridinitril, pyrifenox, pyroxychlor and pyroxyfur; pyrimidine fungicides, such as bupirimate, cyprodinil, diflumetorim, dimethirimol, ethirimol, fenarimol, ferimzone, mepanipyrim, nuarimol, pyrimethanil and triarimol; pyrrole fungicides, such as fenpiclonil, fludioxonil and fluoroimide; quinoline fungicides, such as ethoxyquin and halacrinate, 8-hydroxyquinoline sulfate, quinacetol and quinoxyfen; quinone fungicides, such as benquinox, chloranil, dichlone and dithianon; quinoxaline fungicides, such as chinomethionat, chlorquinox and thioquinox; thiazole fungicides, such as ethaboxam, etridiazole, metsulfovax, octhilinone, thiabendazole, thiadifluor and thifluzamide; thiocarbamate fungicides, such as methasulfocarb and prothiocarb; thiophene fungicides, such as ethaboxam and silthiofam; triazine fungicides, such as anilazine; triazole fungicides, such as amisulbrom, bitertanol, fluotrimazole, and triazbutil; urea fungicides, such as bentaluro, pencycuron, and quinazamid; and unclassified fungicides, such as acibenzolar, acypetacs, allyl alcohol, benzalkonium chloride, benzamacril, bethoxazin, carvone, chloropicrin, DBCP, dehydroacetic acid, diclomezine, diethyl pyrocarbonate, fenaminosulf, fenitropan, fenpropidin, formaldehyde, furfural, hexachlorobutadiene, iodomethane, isoprothiolane, methyl bromide, methyl isothiocyanate, metrafenone, nitrostyrene, nitrothal-isopropyl, OCH, 2-phenylphenol, phthalide, piperalin, probenazole, proquinazid, pyroquilon, sodium orthophenylphenoxide, spiroxamine, sultropen, thicyofen, tricyclazole, zinc naphthenate, or mixtures thereof.

The herbicide can be or include carboxylic acid derivatives, which can include benzoic acids and their salts, phenoxy and phenyl substituted carboxylic acids and their salts, and trichloroacetic acid and its salts; carbamic acid derivatives, which can include ethyl N,N-di(n-propyl)thiolcarbamate and pronamide; substituted ureas; substituted triazines; diphenyl ethers, which can include oxyfluorfen and fluoroglycofen; anilides such as propanil; oxyphenoxy herbicides; uracils; nitriles; and other organic herbicides such as dithiopy and, thiazopyr.

The insecticide can be or include acephate, acethion, acetoxon, aldicarb, aldoxycarb, aldrin, allethrin, allyxycarb, alpha-cypermethrin, amidithion, amitraz, amlure, anethol, azethion, azinphos-ethyl, azinphos-methyl, azocyclotin, *bacillus thuringiensis*, BCPE, bendiocarb, bensultap, benzoximate, benzyl acetate, benzyl benzoate, BHC, bifenthrin, binapacryl, bornyl, BPMC, bromophos, bromophos-ethyl, bromopropylate, bufencarb, buprofezin, butacarb, butocarboxim, butonate, butoxycarboxim, calcium arsenate, carbaryl, carbofuran, carbophenothion, carbosulfan, cartap, chlordane, chlordecone, chlordimeform, chlorfenethol, chlorfenson, chlorfensulphide, chlorfenvinphos, chlormephos, chlorobenzilate, chloropenozide, chloropropylate, chlorphoxim, chlorpyrifos, chlorpyrifos methyl, chlorthiophos, clofentezine, CPCBS, CPMC, crotoxyphos, crufomate, cryolite, cufraneb, cyanofenphos, cyanophos, cyanthoate, cyfluthrin, cyhexatin, cypermethrin, cyphenothrin, cyromazine, DAEP, DDT, DDVP, deltamethrin, demeton, demeton-5-methyl, demeton-O-methyl, demeton-S, demeton-5-methyl sulfoxid, demephion-O, demephion-S, dialifor, diazinon, dicapthon, dichlofenthion, dicofol, dicrotophos, dieldrin, dienochlor, diflubenzuron, dihydrorotenone, dimefox, dimetan, dimethoate, dimethrin, dinex, dinitrophenol, dinobuton, dinocap, dioxabenzofos, dioxacarb, dioxathion, disparlure, disulfoton, DMCP, DNOC, d-trans allethrin, endosulfan, endothion, endrin, entice, EPBP, EPN, esfenvalerate, ethiofencarb, ethion, ethoate-methyl, ethoprop, etrimfos, fenamiphos, fenazaflor, fenbutatin-oxide, fenitrothion, fenoxycarb, fenpropathrin, fenson, fensulfothion, fenthion, fenvalerate, flubenzimine, flucythrinate, fluenethyl, flufenoxuron, fluvalinate, fonofos, formetanate hydrochloride, formothion, fosmethilan, fosthietan, furathiocarb, furethrin, grandlure, heptachlor, HETP, hexythiazox, hydramethylnon, hyprene, IPSP, isazophos, isobenzan, isofenphos, isoprocarb, isoprothiolane, isothioate, isoxathion, jodfenphos, kinoprene, lead arsenate, leptophos, lethane, lindane, lythidathion, malathion, mazidox, mecarbam, mecarphon, menazon, mephosfolan, methamidophos, methidathion, methiocarb, methomyl, methoprene, methoxychlor, methoxyfenozide, methyl parathion, methyl phencapton, mevinphos, mexacarbate, MIPC, mirex, monocrotophos, MTMC, naled, nicotine, nonachlor, omethoate, ovex, oxamyl, oxydeprofs, oxydisulfoton, oxythioquinox, paraoxon, parathion, paris green, permethrin, perthane, phencapton, phenthoate, phorate, phosalone, phosfolan, phosmet, phosnichlor, phosphamidon, phoxim, pirimicarb, pirimiphos-ethyl, pirimiphos-methyl, plifenate, profenofos, promecarb, propargite, propetamphos, propoxur, prothidathion, prothiophos, prothoate, PTMD, pyridaben, pyridaphenthion, quinalphos, resmethrin, ronnell, rotenone, ryania, s-bioallethrin, salithion, schradan, sodium fluosilicate, sophamide, sulfotepp, sulprofos, tebufenozide, tefluthrin, temephos, TEPP, terbufos, tetrachlorvinphos, tetradifon, tetramethrin, tetrasul, thallium sulfate, thiocarboxime, thiocyclam hydrogenoxalate, thiometon, tolclofos-methyl, toxaphene, triazamate, triazophos, trichlorfon, trichloronate, triflumuron, trimethacarb, vamidothion, and xylylcarb, and mixtures thereof.

The algicide can be or include 3-bethoxazin, copper(II) tetraoxosulfate, cybutryne, dichlone, dichlorophen, endothal, fentin, calcium hydroxide, nabam, quinoclamine, quinonamid, and simazine.

The algicide can be or include a compound having the formula:

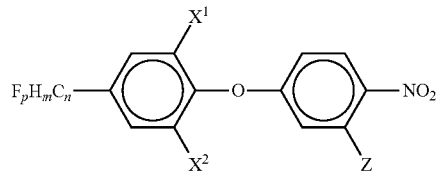

wherein $X^1$, $X^2$ are independently selected from hydrogen, halogen, trihalomethyl, cyano, and ($C_1$ to $C_4$) alkyl; Z is selected from the group consisting of hydrogen, halogen, cyano, carboxy or salt thereof, lower alkylthio, lower carbalkoxy, lower carboxyalkyl, lower carbalkoxyalkyl, lower carbalkoxyalkoxycarbonyl, lower carbalkoxyalkoxy, lower alkoxy, lower cycloalkoxy, lower alkenyl, lower alkyl, lower cycloalkyl, unsubstituted or substituted amino, $R^2O$ in which $R^2$ represents a hydrogen atom or the ester bonded acid radical of an inorganic or organic oxyacid; p is an integer from 1 to 2n+1; m is an integer of 0 to 2n; n is an integer of 1 to 5; m+p=2n+1; and in addition to the compound a 3-isothiazolone in a weight ratio of the compound to 3-isothiazolon of about 0.1 to 100 to about 100.

The molluscicides can be or include N-bromoacetamide, calcium arsenate, cloethocarb, copper acetoarsenite, copper sulfate, fentin, metaldehyde, methiocarb, niclosamide, pentachlorophenol, sodium pentachlorophenolate, tazimcarb, thiodicarb, tralopyril, bis(tributyltin) oxide, trifenmorph, trimethacarb.

The bacteriocides can be or include 2-bromo-2-nitropropane-1,3-diol, copper(II) hydroxide, methylphenol, 4,4'-dichloro-2,2'-methylenediphenol, di-2-pyridyl disulfide 1,1'-dioxide, N-[2-(2-dodecylaminoethylamino)ethyl]glycine, sodium (EZ)-4-dimethylaminobenzenediazosulfonate, formaldehyde, μ-(2,2'-binaphthalene-3-sulfonyloxy)bis(phenylmercury), bis(8-hydroxyquinolinium) sulfate ("8-hydroxyquinoline sulfate"), 1L-1,3,4/2,5,6-1-deoxy-2,3,4,5,6-pentahydroxycyclohexyl 2-amino-2,3,4,6-tetradeoxy-4-α-iminoglycino)-α-D-arabino-hexopyranoside, 2-chloro-6-trichloromethylpyridine, 2-octyl-1,2-thiazol-3(2H)-one, 5-ethyl-5,8-dihydro-8-oxo[1,3]dioxolo[4,5-g]quinoline-7-carboxylic acid, (4S,4aR,5S,5aR,6S,12aS)-4-dimethylamino-1,4,4a,5,5a,6,11,12a-octahydro-3,5,6,10,12,12a-hexahydroxy-6-methyl-1,11-dioxonaphthacene-2-carboxamide, 3-allyloxy-1,2-benzothiazole 1,1-dioxide, O-2-deoxy-2-methylamino-α-L-glucopyranosyl-(1-2)-O-5-deoxy-3-C-formyl-α-L-lyxofuranosyl-(1-4)-$N^1$,$N^3$-diamidino-D-streptamine, 2',3,3',4,5,6-hexachlorophthalanilic acid, and sodium salt of (2-carboxyphenylthio)ethylmercury.

The antifouling agent can be or include 5-chloro-2-(2,4-dichlorophenoxy)phenol; 2-phenylphenol; benzisothiazolinone; bromine monochloride; manganese ethylenebisdithiocarbamate; zinc dimethyl dithiocarbamate; 2-methyl-4-t-butylamino-6-cyclopropylamino-s-triazine; 2,4,5,6-tetrachloroisophthalonitrile; N,N-dimethyl dichlorophenyl urea; zinc ethylenebisdithiocarbamate; copper thiocyanate; copper pyrithione; zinc pyrithione; chlorinated paraffin; 4,5-dichloro-2-n-octyl-3-isothiazolone; N-(fluorodichloromethylthio)-phthalimide; N,N-dimethyl-N'-phenyl-N'-fluorodichloromethylthio-sulfamide; zinc 2-pyridinethiol-1-oxide; tetramethylthiuram disulfide; 2,4,6-trichlorophenylmaleimide; 2,3,5,6-tetrachloro-4-(methylsulfonyl)-pyridine; 3-iodo-2-propynyl butyl carbamate; diiodomethyl p-tolyl sulfone; bis dimethyl dithiocarbamoyl zinc ethylenebisdithiocarbamate; phenyl (bispyridil) bismuth dichloride; 2-(4-thiazolyl)-benzimidazole; pyridine triphenyl borane; phenylamide compounds; pyridazinone compounds; or 2-haloalkoxyaryl-3-isothiazolones; derivatives thereof, and mixtures thereof.

The antifouling agent can be or include polyhydroxystyrene of the novolak type; (meth)acrylic acid and one or more (meth)acrylate or (meth)acrylamide; menadione triaminotriazine bisulfite(I) ("MTB"); menadione(bis) piperazine bisulfite(II) ("MBP"); 3-aryl-5,6-dihydro-1,4,2-oxathiazines and oxides thereof; 2-arylpyrrole; 3',4'-dichlorodecananilide; 3',5'-dichlorodecanailide; 3',4'-dichloro-3-chloropropaneanilide; N-(3,4-dichlorophenyl)heptanamide; octanilide; N-(3,4-dichlorophenyl)octanamide; N-(3,4-dichlorophenyl) hexanamide; 2-chloro-2',6'-diethyl-N-(methoxymethyl)acetanilide; 1,3-dithiolo(4,5-d)-1,3-dithiino-2-thione compounds; a lipid enzyme coated with 6 to 30 carbon atoms; one or more of 4,5-dichloro-2-n-octyl-4-isothiazolin-3-one, 2-n- octyl-4-isothiazolin-3-one, and salts thereof mixed with one or more compounds selected from 5-[2-(2-butoxyethoxy) ethoxymethyl]-6-propyl-1,3-benzodioxole and octachlorodipropyl ether; 4,5-dicyano-1,3-dithiole-2-one (or thione) containing oxygen or sulfur; 1,2,5-thiadiazolo-1,3-dithiole-2-one or thione; 3,5-dihalogeno-1,2,6-thiadiazin-4-one; hydantoin and substituted hydantoin, such as phenyloin; dichloro-s-triazinetrione, trichloro-s-triazinetrione; zinc dimethyldithiocarbamate; manganese ethylenebisdithiocarbamate; 2-methylthio-4-t-butylamino-6-cyclopropylamino-s-triazine; 2,4,5,6-tetrachloroisophthalonitrile; N,N-dimethyldichlorophenylurea; 4,5-dichloro-2-n-octyl-3(2H)-isothiazolone; N-(fluorodichloromethylthio)-phthalimide; N,N'-dimethyl-N'-phenyl-(N-fluorodichloromethylthio)sulfamide; 2,4,6-trichlorophenylmaleimide; 2,3,5,6-tetrachloro-4-(methylsulfonyl)pyridine; 3-iodo-2-propenylbutyl carbamate; diiodomethyl-p-tolylsulfone; dimethyldithiocarbamoylzinc ethylenebisdithiocarbamate; phenyl(bispyridine)bismuth dichloride; 2-(4-thiazolyl)benzimidazole; pyridine-triphenylborane; zinc ethylenebisdithiocarbamate; stearylamine-triphenylboron; and laurylamine-triphenylboron; 3-iodo-2-propynyl butyl carbamate; 5-chloro-2-(2,4-dichlorophenoxy)phenol; 3,4,4'-trichlorocarbanilide; derivatives thereof; and mixtures thereof.

The antifouling agent can be or include one or more isothiazolones, furanones, and combinations thereof. The antifouling agent can be 4,5-dichloro-2-n-octyl-4-isothiazolin-3-one. The antifouling agent can be (1'RS,5E)-3-(1'-Bromoethyl)-4-bromo-5-(bromomethylidene)-2(5H)-furanone; (1'RS)-3-(1'-Bromoethyl)-5-(dibromomethylidene)-2(5H)-furanone; (1'RS,5Z)-3-(1'-Bromohexyl)-4-bromo-5-(bromomethylidene)-2(5H)-furanone; and (1'RS)-3-(1'-Bromohexyl)-5-(dibromomethylidene)-2(5H)-furanone. In one or more embodiments, the furanone can have the structure:

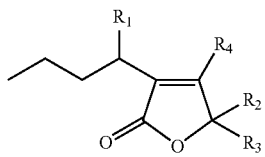

wherein $R_1$, $R_2$ and $R_3$ are each selected from the group comprising a hydrogen atom, a hydroxyl group, an alkyl group containing from 1 to 10 carbon atoms, an ester group containing from 1 to 10 carbon atoms or a halogenated alkene containing from 1 to 10 carbon atoms or $R_2$ and $R_3$ together may comprise an unsubstituted or a halogenated alkene containing from 1 to 10 carbon atoms, and $R_4$ is a hydrogen or a halogen atom.

The antifouling agent can be or include a 3-isothiazolone compound. In one or more embodiments, the 3-isothiazolone can have the structure:

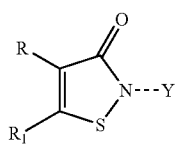

wherein: Y is an unsubstituted or substituted ($C_7$-$C_{18}$) alkyl group, an unsubstituted or substituted ($C_7$-$C_{18}$) alkenyl or alkynyl group, an unsubstituted or substituted ($C_7$-$C_{12}$) cycloalkyl group, an unsubstituted or substituted ($C_7$-$C_{10}$) aralkyl group, or a substituted ($C_7$-$C_{10}$) aryl group; R and $R_1$ can independently be hydrogen, halogen or ($C_1$-$C_4$) alkyl groups; or R and $R_1$ can be taken together with the C=C double bond of the isothiazolone ring to form an unsubstituted or substituted benzene ring. The 3-isothiazolone can be 2-n-octyl-3-isothiazolone, 4,5-dichloro-2-n-octyl-3-isothiazolone, 4,5-dichloro-2-benzyl-3-isothiazolone, 2-benzyl-3-isothiazolone and 2-haloalkoxyaryl-3-isothiazolones, such as 2-(4-trifluoromethoxyphenyl)-3-isothiazolone, 5-chloro-2-methyl-3-isothiazolone, 2-methyl-3-isothiazolone, 4,5-trimethylene-3-isothiazolone, 2-(4-trifluoromethoxyphenyl)-5-chloro-3-isothiazolone and 2-(4-trifluoromethoxyphenyl)-4,5-dichloro-3-isothiazolone), 2-methyl-4-isothiazolin-3-one, benzisothiazolone, 4,5-dichloro-2-n-octyl-4-isothiazolino-3-one, 5-chloro-2-methyl-4-isothiazolin-3-one, and 2-methyl-4-isothiazolin-3-one.

The antifouling agent can be or include a chlorinated organotin compound. An illustrative chlorinated organotin compound can include one or more is-trialkylstannyl derivatives of chlorinated polycyclic dicarboxylic acids having the general structure:

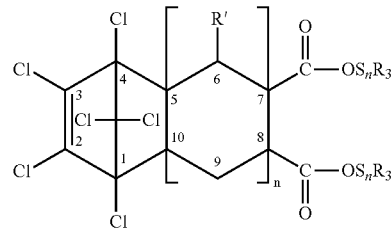

wherein R can be a lower alkyl, R' can be hydrogen or $CH_3$ and n can be 0 or 1.

The antigouling agent can be or include antibiotics. Illustrative antibioitics can include penicillin V, penicillin G, ampicillin, cephalosporin, chlortetracycline, neomycin, rifamycin, and variotin.

The antifouling agent can be or include a metal containing acrylic resin. The metal containing acrylic resin can include various substances, for example inorganic compounds, metal-containing organic compounds and metal-free organic compounds. Illustrative examples various substances which can be in a metal containing acrylic resin can include, but are not limited to cuprous oxide, manganese ethylenebisdithiocarbamate, zinc dimethylcarbamate, 2-methylthio-4-t-butylamino-6-cyclopropylamino-s-triazine, 2,4,6-tetrachloroisophthalonirile, N,N-dimethyldicholorophenylurea, zinc ethylenebisdithiocarbamate, copper rhodanate, 4,5-dichloro-2-n-octyl-3(2H)-isothiazolone, N-(fluorodichloromethylthio)phthalimide, N,N'-dimethyl-N'-phenyl-(N-fluorodichloromethylthio)sulfamide, 2-pyridinethiol-1-oxide zinc salt and copper salt, tetramethylthiuram disulfide, 2,4,6-trichlorophenylmaleimide, 2,3,5,6-tetrachloro-4-(methylsulfonyl)pyridine, 3-iodo-2-propylbutyl carbamate, diiodomethyl-p-tolyl sulfone, phenyl(bispyridyl)bismuth dichloride, 2-(4-thiazolyl)-benzimidazole, triphenylboron pyridine salt and so forth.

In one or more embodiments, the antifouling agent can be or include one or more geometrical isomers of an acrylonitrile compound, an acylonitrile salt, or mixtures thereof, having the formula:

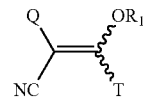

wherein T is phenyl which is substituted by $R_2$, or pyridyl which is substituted by $R_2$; Q is phenyl which may be substituted by $R_3$, thienyl which may be substituted by $R_3$, pyridyl which may be substituted by $R_3$, or benzyl which may be substituted by $R_3$. $R_1$ is —C═$OR_4$ or —C═$SR_4$; each of $R_2$ and $R_3$ is halogen, alkyl which can be substituted, alkenyl which can be substituted, alkynyl which can be substituted, alkoxy which can be substituted, alkenyloxy which can be substituted, alkynyloxy which can be substituted, alkylthio which can be substituted, alkylsulfinyl which can be substituted, alkylsulfonyl which can be substituted, alkenylthio which can be substituted, alkenylsulfinyl which can be substituted, alkenylsulfonyl which can be substituted, alkynylthio which can be substituted, alkynylsulfinyl which can be substituted, alkynylsulfonyl which can be substituted, nitro, cyano, phenyl which can be substituted, phenoxy which can be substituted, phenylthio which can be substituted, phenylsulfinyl which can be substituted, phenylsulfonyl which can be substituted, benzyl which can be substituted, benzyloxy which can be substituted, benzylthio which can be substituted, or benzoyl which can be substituted; $R_4$ is alkyl which can be substituted, alkenyl which can be substituted, alkynyl which can be substituted, alkoxy which can be substituted, alkenyloxy which can be substituted, alkynyloxy which can be substituted, alkylthio which can be substituted, alkenylthio which can be substituted, alkynylthio which can be substituted, cycloalkyl, cycloalkyloxy, cycloalkylthio, —N($R_5$)$R_6$, phenyl which can be substituted, phenoxy which can be substituted, phenylthio which can be substituted, benzyl which can be substituted, benzyloxy which can be substituted, benzylthio which can be substituted, -J, —O-J or —S-J; each of $R_5$ and $R_6$ is hydrogen, alkyl or alkoxy; J is a 5- or 6-membered heterocyclic group (the heterocyclic group can be substituted) having from 1 to 4 hetero atoms of at least one type selected from the group consisting of O, S and N, provided that the following compounds are excluded: (1) a compound wherein T is phenyl which is substituted by $R_2$, Q is thienyl which can be substituted by $R_3$, $R_1$ is —C═$OR_4$, and $R_4$ is alkyl which can be substituted, alkenyl which can be substituted, alkynyl which can be substituted, alkoxy which can be substituted, alkenyloxy which can be substituted, alkynyloxy which can be substituted, cycloalkyl, cycloalkyloxy, —N($R_5$)$R_6$, phenyl which can be substituted, phenoxy which can be substituted, phenylthio which can be substituted, benzyl which can be substituted, benzyloxy which can be substituted, benzylthio which can be substituted, -J, —O-J or —S-J, (2) a compound wherein T is phenyl which is substituted by $R_2$, Q is thienyl which can be substituted by $R_3$, $R_1$ is —C═$SR_4$, and $R_4$ is —N($R_5$)$R_6$, (3) a compound wherein T is pyridyl which is substituted by $R_2$, Q is thienyl which can be substituted by $R_3$, or pyridyl which can be substituted by $R_3$, $R_1$ is —C═$OR_4$, and $R_4$ is alkyl, (4) α-(3,5-dimethoxyphenyl)-β-(2-methoxy-4-methylphenyl)-β-ace toxyacrylonitrile, and (5) α-(3,5-dimethoxyphenyl)-β-(2,6-dimethoxy-4-methylphenyl)-β-acetoxyacrylonitrile], wherein the geometrical isomer has a longer retention time when analyzed by reversed-phase liquid chromatography in which a packing comprising silica having chemically bonded thereto an alkyl group selected from trimethyl, octyl and octadecyl, is used as the stationary phase, and a polar solvent selected from water, methanol and acetonitrile, is used as the mobile phase, and the geometrical isomer mixture contains such geometrical isomer in a larger proportion; and a process for their production.

In one or more embodiments, the antifouling agent can be or include one or more *capsicum* derivatives. Illustrative *capsicum* derivatives can include 8-methyl-N-vanillyl-6-nonenamide ("capsaicin"), N-(4-Hydroxy-3-methoxybenzyl)-8-methylnonanamide ("dihydrocapsaicin"), N-(4-Hydroxy-3-methoxybenzyl)-7-methyloctanamide ("nordihydrocapsaicin"), N-(4-Hydroxy-3-methoxybenzyl)-9-methyldecanamide ("homodihydrocapsaicin"), (3E)-N-(4-Hydroxy-3-methoxybenzyl)-9-methyldec-7-enamide ("homocapsaicin"), and N-(4-hydroxy-3-methoxy-benzyl) nonanamide ("nonivamide"). Illustrative derivatives of capsaicin can include cayenne pepper and oleoresin *capsicum*. In one or more embodiments, the *capsicum* derivatives can be mixed or otherwise combined with other antifouling agents.

In one or more embodiments, the antifouling agent can be or include one or more surfactants, emulsifiers, or both. Illustrative examples of surfactants and emulsifiers can include sorbitan mono-oleate and sorbitan tri-oleate, polyoxyethylene sorbitan mono-oleate, polyoxyethylene sorbitan tri-oleate, polyoxyethylene sorbitan mono-sterate, saponin, and cholesterol.

The antifouling agent can be or include silver acetate and silver citrate; quaternary amine compounds, such as cetrimide; isoniazid; benzalkonium chloride; sulfa-based antimocrobial compounds such as sulfanilamide, sulfaguanidine, sulfathiazole, sulfacetamide, sulfabenzamide and sulfamethiazole; cholesterol; saponins, and sapotoxins. In one or more embodiments, the antifouling agent can be Irgarol®, which is a slime inhibitor manufactured and available from Ciba Specialty Chemicals.

The antifouling agent can be or include a bio-jelly. Bio-jelly growth can be promoted by compounds which can include 1,8-cineole, benzylidene aniline derivatives and compounds having styrene or cinnamolyl groups. A bio-jelly promoting or producing compound can have the formula:

A-N═CH—B where A and B are organic moieties have 3 to 26 carbon atoms, respectively.

The antifouling bio-jelly producing agents can be or include one or more benzylidene aniline derivatives having the formula (I):

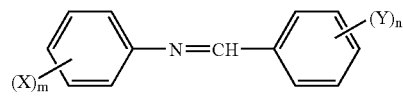

wherein n and m are integers of 0-5 respectively, X may be the same or different and is selected from the group consisting of halogen, hydrocarbon or alkoxy having 1-20 carbon atoms, nitro, amino, hydroxyl, carboxyl, ester, cyano, azo and azomethine; Y may be the same or different and is selected from the group consisting of halogen, hydrocarbon or alkoxy having 1-20 carbon atoms, nitro, amino, hydroxyl, carbosyl, ester, cyano, azo, and azomethine. Preferably, n and m are 0 or 1 respectively. X is preferably a halogen, such as chloro or bromo; a hydrocarbon, especially a saturated or unsaturated aliphatic hydrocarbon having 1-18 carbon atoms which may or may not have a side chain, for example ethyl, isopropyl, n-propyl, t-butyl, hexyl, octyl, 2-ethylhexyl, nonyl, decyl, lauryl, stearyl and oleyl; an alkoxy, especially saturated or unsaturated an alkoxy group having 1-18 carbon atoms, for example ethoxy, butoxy, hexyloxy, octoxy, nonyloxy, stearyloxy, benzyloxy and naphtyloxy; hydroxy; and nitro.

Illustrative examples of bio-jelly producing agents can be 4'-ethylbenzylidene-4-ethyl aniline, 2'-isopropylbenzylidene-4-butoxyaniline, 4-nonyl benzylideneaniline, 4'-stearylbenzylidene-4-butoxyaniline, benzylidene-4-nonyloxyaniline, 4'-ethylbenzylidene-4-hexylaniline, 4'-ethoxybenzylidene-4-n-octylaniline, 2'-butoxybenzylidene-2-ethylaniline, 4'-naphthyloxy benzylidene aniline, 4'-ethylbenzylidene-4-nitroaniline, 3',4'-diethylbenzylidene-4-butylaniline, terephthalidene-di-4-butoxyaniline, di-4-butoxybenzylidene-p-phenylenediamine, benzylidene-4-n-octylaniline, 4'-nonylbenzylidene-4-methoxyaniline, 4'-ethylhexylbenzylideneaniline, 4',4-oleyloxybenzylideneaniline, 2'-ethoxy-4'-bromobenzylideneaniline, 4'-hexylbenzylidene-4-octoxyaniline, 4'-nonyloxybenzylidene-4-nonylaniline, 4'-nonylbenzylidene-2-butoxyaniline, benzylideneoctylamine, butylideneaniline, octylidene-4-hexylaniline, octylidene-4-octylaniline, cinnamilideneaniline and cinnamilideneoctylamine.

The antifouling bio-jelly producing agents can be or include one or more benzylidene aniline derivatives having the formula (II):

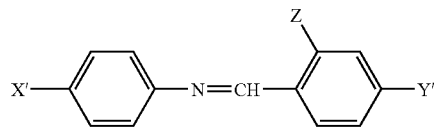

wherein X' is selected from the group consisting of hydrogen, halogen, hydroxyl and nitro; Y' is selected from the group consisting of hydrogen, chloro and methyl; and Z is selected from the group consisting of hydrogen and hydroxyl; in which at least two of X', Y' and Z are simultaneously hydrogen atoms.

Illustrative examples of bio-jelly producing agents having the formula (II) can include benzylidene aniline, benzylidene-4-chloroaniline, benzylidene-4-bromoaniline, benzylidene-4-nitroaniline, benzylidene-4-hydroxyaniline, 4'-methylbenzylideneaniline, 4'-chloro benzylideneaniline and 2'-hydroxybenzylideneaniline.

The antifouling bio-jelly producing agents can be or include one or more styryl or cinnamoyl groups having the formula (III):

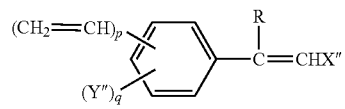

wherein, X" is selected from the group consisting of hydrogen, carboxyl, hydroxymethyl, aldehyde, carbonyl and amide; when X" is carboxyl, it may be an ester or salt thereof, Y" is selected from the group consisting of halogen, alkyl, halogenated alkyl, nitro, alkoxy, carboxyl, ester, cyano, azo, azomethine, amino, alkoxysilyl and alkoxysilylalkyl; R is selected from the group consisting of hydrogen, alkyl and halogen; q is an integer of 0-2, p is an integer of 0 or 1.

Illustrative examples of bio-jelly producing agents having the formula (III) can be divided into two categories, one which can be a styrene derivative wherein X" is hydrogen, the other can be a cinnamoyl derivative wherein X" is a carboxyl (cinnamic acid), a hydroxymethyl (cinnamic alcohol), an aldehyde (cinnamic aldehyde) or an amide (cinnamic amide).

The antifouling bio-jelly producing agents can be or include one or more compounds having the formula (IV):

X''' is nitrogen or C—Y''', wherein Y''' is $NH_2$, $SO_3H$, CHO or COOH. That is, when X''' is nitrogen, compound IV represents a pyridine ring, when Y''' is $NH_2$, compound IV represents an aniline ring, when Y''' is $NO_2$, compound (IV) represents a nitrobenzene ring, when Y''' is $SO_3H$, compound (IV) represents a benzenslufonic acid ring, when Y''' is CHO, compound (IV) represents benzaldehyde ring, and when Y''' is COOH, compound (IV) represents a benzoic acid ring. R' is selected from the group consisting of hydrocarbon having 1-20 carbon atoms, such as branched or unbranched alkyl group including methyl, ethyl, hexyl, octyl, nonyl, decyl, undecyl, dodecyl and stearyl; cycloalkyl such as cyclobutyl, cyclopentyl, cyclohexyl, cycloheptyl, cyclooctyl and cyclododecyl; alkenyl such as propenyl, butenyl, hexenyl, octenyl and dodesenyl; and aryl such as phenyl, tryl, xylyl, and naphthyl; and alkoxy having 1-20 carbon atoms such as ethoxy, nonyloxy, oleyl. Among the substituents, a hydrocarbon and an alkoxy both having 6-12 carbon atoms are preferable for antifouling ability and controlling emission. The substituent R' can be at ortho- or para-, preferably para-position to the X''' in the formula of compound (IV).

Illustrative examples of bio-jelly producing agents having the formula (IV) can include, but are not limited to, 2-methylpyridine, 4-ethylpyridine, 4-hexylpyridine, 4-octylpyridine, 4-nonylpyridine, 4-decylpyridine, 4-laurylpyridine, aniline, 4-ethylaniline, 4-hexylaniline, 4-octylaniline, 4-nonylaniline, 4-decylaniline, 4-dodecylaniline, 4-ethylnitrobenzene, 4-octyl benzenesulfonic acid, 4-ethylbenzenesulfonic acid, 4-hexylnitrobenzene, 4-octylbenzaldehyde, 4-nonylbenzaldehyde, 4-ethylbenzenesulfonic acid, 2-octylbenzoic acid, 4-hexyloxy aniline, 4-nonyloxypyridine, 4-hexyl-2-chloro aniline, 4-ethoxy-2-chloroaniline, 4-nonyloxyaniline, 4-decylbenzoic acid, 4-oleylaniline and 4-stearylaniline.

The anti-fouling agent can be or include a non-tin-containing, water-insoluble, organo or inorganic compound selected from the group consisting of heterocyclic compounds, aromatic compounds substituted with heteroatom substitutents, amino compounds, carbocyclic vinyl ether ketones, phospho compounds, polychlorinated carbocyclic and acyclic compounds, chlorinated carbocyclic carboxylates, copper (cupric) oleate, alkyl dimethyl benzene, 2,4-d,α-chlorocrotyl ester, 2,3-dichloro-2-methylpropionic acid sodium salt, diphenylacetrontrile, n-dodecyl thiocyanate, ethyl-N,N-dipropylthiolcarbamate, ethyl-N,N-diisobutyl thiolcarbamate, ethylenebis(dithiocarbamato) zinc, ferric dimethyldithiocarbamate, isobornyl thiocyanoacetate, manganese ethylenebisdithiocarbamate, disodium ethylene bisdithiocarbamate, s-propylbutylethylthiocarbamate, piperonyl-bis(2-[2'-n-butoxyethoxy]ethyl)acetal, piperonyl butoxide alpha[2-(2-n-butoxyethoxy)-ethoxy]-4,5-methylenedioxy 2-propyltoluene, piperonyl cyclonen, 3',4'-dichloropropionalide, ethylene-1,2-bis(thiocarbamoyldimethylthiocarbamoyldisulfide), 5,6,7,8-tetrahydro-1-naphthyl methylcarbamate, 2-thiocyanoethyl dodecanoate, tetramethylthiuram disulfide, tert-butyl 4 (or 5)-chloro-2-methylcyclohexanecarboxylate, S-propyldipropylthiocarbamate, zinc ethylene bisdithiocarbamate, zinc dimethyldithiocarbamate, antimony tartrate, antimony potassium tartrate, boric acid, ammonium sulfamate, 4-allyl-2-methoxyphenol, 2,3-dichloro-1,4-napthoquinone, cetylpyridinium, chloride, diphenylamine, 2-chloro-N,N-diallylacetamide, cetyltrimethylammonium bromide, 2-isopropylamino-4-chloro-6-ethylamino triazine, dimethoxythiophosphate derivative of diphenyl sulfide, ethyl 4-chloro-alpha(4-chlorophenyl), alpha-hydroxy benzene acetate methyl, diethylamino, dimethoxythiophosphate derivative of pyrimidine, ethoxylated nonylphenol, unsymmetrical hydrazine derivative of succinic acid, allyl, methylhydroxy substituted cyclopententone ester of dimethylpropenyl cyclopropane carboxylic acid, 2,5-dichloro, 3-amino benzoic acid, cinnamic acid, 2-6-dichloro, 4-nitroaniline, dichloro, isopropenyl anilide, dodecylguanidine monoacetate, trichlorophenyl, acetic acid, diphenyl ether, chlorophenyl derivative of the isobutyric acid ester of hydroxylacetonitrile, trihydroxybenzoic acid, 3-indolacetic acid, 3,5-dichloro-N-(3,3-dimethylpropyne)benzamide, napthalene acetamide dimethylethylphenoxy-cyclohexyl-2-propynyl sulfite, o-phenylphenol, phthalic acid, chlorophenyl-isopropyl, propynyl carbamate, N-phenyl, N-butynyl chloroacetamide, amino, chloro, phenyl derivative of azacyclohexamine, N,N-diallyl-2-chloroacetamide, aminoacetic acid derivative of methylphosphonate, 3,5-dinitro, 4-N,N-dipropylamino benzene sulfonamide, 2-chloro-2-propenyl diethylcarbamodithioate, acrolein phenylhydrazone, ammonium saccharinate, 2-allyl-4-hydroxy-3-methyl-2-cyclopenten-1-one ester of 2,2-dimethyl-3-(2-methylpropenyl cyclopropanecarboxylic acid), 4-allyl-2-methoxyphenol o-(allyloxy)phenyl methylcarbamate, 2-(allylthio)-2-thiazoline, 1,2,3,4,7,7-hexachloro-5,6-bis(chloromethyl)-2-norbornene, 4-ethylamino-6-isopropylamino-2-methylthio-1,3,5-triazine, 2-amino-3-chloro-1,4-napthoquinone, 3-amino-5-nitro-o-toluamide, 3-amino-1,2,4-triazole, 2-chloro-4-ethylamino-6-isopropylamino-S-triazine, 4-chloro-m-chlorocarbanilate, 6-chloropiperonyl chrysanthemumate, N-butyl-N-ethyl-α,α,α-trifluoro-2-6-dinitro-p-toluidine, bis(p-chlorophenyl)-3-pyridine methanol, his (dialkylphosphinothioyl) disulfide, bis(4-hydroxyiminomethylpyridinum-1-methyl)ether dichloride, 2,4-bis(3-methoxylpropylamino)-6-methylthio-S-triazine bis(pentachloro-2,4-cyclopentadien-1-yl), N-(4-bromo-3-chlorophenyl)-N'-methoxy-N'-methyl urea, 5-(bromomethyl)-1,2,3,4,7,7-hexachloro-2-norbornene, S-(O,O-diisopropyl phosphoro-dithionate of N-(2-mercaptoethyl)benzenesulfonamide, benzamidooxy-acetic acid, 3-benzylideneamino-4-phenylthiazoline-2-thione, bis (p-chlorophenoxy)methane bis(4-chlorophenyl) disulfide, 1,1-bis (pochlorophenyl)ethane 1,1-bis(p-chlorphenyl)-ethanol, o,o-dimethyl-o-2,5-dichloro-4-bromophenylthionophosphate, O,O-dimethyl-2,2,2-trichloro-1-n-butyryloxyethyl phosphonate, N-butylacetanilide, 2-tert-butylamino-4-chloro-6-ethyl amino-5-triazine, 2-tert-butylamino-4-ethylamino-6-methylmercapto-S-triazine, 4-tert-butyl-2-chlorophenylmethyl methylphosphoramidite, o-(4-tert-butyl-2-chlorophenyl)o-methyl phosphoramidothionate, butyl 3,4-dihydro-2,2-dimethyl-4-oxo-1,2h-pyran-6-carboxylate, n-butyl-9-hydroxyfluorene-(9)-carboxylate, 2-(p-tert-butylphenoxy)cyclohexyl 2-propynyl sulfite, 1-butyn-3-yl m-chlorophenyl-carbamate, N-trichloro-methylthio-4-cyclohexene-1,2-docarboximide, 1-napththyl n-methylcarbamate, S-[[(p-chlorophenyl)thiol]methyl]O,O-diethylphosphorodithioate, 2-chloro-N,N-diallyl-acetamide, 2-chloroallyl diethyl-dithiocarbamate, cetyldimethylethylammonium bromide, cetylpyridinium chloride, tetrachloro-p-benzoquinone, 2-chloro-4,6-bis(diethylamino)-s-triazine, p-chlorobenzyl p-chlorophenyl sulfide, 1,2,3,5,6,-7,8,8-octachloro-2,3,3a,4,7,7a-hexahydro-4,7-methanoindene, 1-(3-chlorallyl)-3,5,7-triaza-1-azoniaadamantane chloride, ethyl 4,4'-dichlorobenzylate, 5-chloro-2-benzothiazolethiol zinc salt, p-chlorobenzyl p-fluorophenyl sulfide, 1-chloro-N'-(3, 4-dichlorophenyl) N,N-dimethylformamidine, 4-chloro-3,5-dimethyl phenoxy-ethanol, 1,4-dichloro-2,5-dimethoxybenzene, 1-(chloro-2-norbornyl)-3,3-dimethylurea, S-(p-chloro-α-phenylbenzyl) 0,0-diethyl phosphorodithioate, p-chlorophenyl ester of benzene-sulfonic acid, N-3-chlorophenyl-1-(isopropyl-carbamoyl-1)-ethyl carbamate, 3-(p-chlorophenyl)-5-methyl rhodanine, 4 (and 6)-chloro-2-phenylphenol sodium salt, p-chlorophenyl phenyl sulfone, 4-chlorophenyl 2,4,5-trichloro-phenylazosulfide, N-(5-chloro-5-thiazolyl)propionamide, 2-[4-chloro-o-tolyl)oxy] propionanilide, 2-chloro-1-(2,4,5-trichloro-phenyl) vinyl dimethyl phosphate, N'-(4-chlorophenoxy)phenyl N,N-dimethylurea, isopropyl N-(3-chlorophenyl) carbamate, copper 8-quinolinolate, 2-(2,4-dihydroxyphenyl)-1-cyclohexene-1-carboxylic acid-lactone O,O-diethylphosphorothioate, 2-chloro-4-dimethylamino-6-methylpyrimidine, 3-(2-cyclopenten-1-yl)-2-methyl-4-oxo-2-cyclopenten-1-yl chrysanthemunate, α-cyclohexyl-α-phenyl-3-pyridyl-methanol, hydrochloride, N'-cyclo-octyl-N,N-dimethylurea, 4'-dichlorocyclopropanecarboxanilide, 2,4-dichlorophenoxyacetic acid, 3,5-dimethyl-1,3,5,2H-tetrahydrothiadiazine-2-thione, tetra-hydro-3,5-dimethyl-2H-1,3,5-thiadiazine-2-thione, 4-(2,4-dichlorophenoxy) butyric acid, dimethyl 2,3,5,6-tetrachloroterephthalate, decyltriphenylphosphonium-bromochlorotriphenylstannate, dehydroacetic acid (and its sodium salt), tris and bis(2,4-dichlorophenoxyethyl) phosphate, 2-methyl-thio-4-isopropylamino-6-methylamino-s-triazine, S-2,3-dichloroallyl N,N-diisopropyl thiolcarbamate, 1,3-diaza-2,4-cyclopentadiene, N,N-di-n-butyl-p-chlorobenzene-sulfonamide 3,6-dichloro-o-anisic acid, O-(2-chloro-4-nitrophenyl) O,O-dimethyl phosphorothioate, 2,6-dichlorobenzonitrile, 2,3-dichloro-1,4-naphthoquinone, 1,3-bis(1-hydroxy-2,2,2-trichloroethyl) urea, 3,4-dichlorobenzyl methylcarbamate (80%) mixture with 2,3-dichlorobenzyl methylcarbamate (20%), 1,1-dichloro-2,2-bis(p-ethylphenyl)ethane, 2,4-dichloro-6-(o-chloro-anilino)-s-triazine, N-(dichlorofluoromethylthio)-N'N'-dimethyl-n-phenyl sulfamide, 4,4'-dichloro-N-methylbenzene-sulfoanilide, 2,6-dichloro-4-nitroaniline, 2,5-dichloro-3-nitrobenzoic acid, 5,2'-dichloro-4'-nitro-salicylanilide ethanolamine salt, 2',5'-dichloro-4'-nitrososalicylanilide, 2,2'-dihydroxy-5,5'-dichlorophenylmethane, 1-(2,4-dichlorophenoxyacetyl)-3,5-dimethylpyrazole, N-3,4-dichlorophenyl N'-5-chloro-2-(2-sodium sulfonyl-4-chlorophenoxy)phenyl urea, 2,4-dichlorophenyl ester of benzene sulfonic acid, 2,4-dichlorophenyl methanesulfonate, 2,4-dichlorophenyl 4-nitrophenyl ether 4-dichlorotetrahydrothiophene 1,1-dioxide, 4,4'-dichloro-alpha-trichloromethylbenzhydrol, 3',4'-dichloro-2-methacrylanilide (Diethoxyphosphinothioylthio) gamma-butyrolactone, O,O-diethyl s-carboethoxymethyl phosphorothioate, O,O-diethyl O-naphthylamido phosphorothioate, O,O-diethyl O-3,5,6-trichloro-2-pyridyl phosphorothioate, 2,2'-dihydroxy-3,5,3',5',4"-pentachlorotriphenylmethane 2"-sodium sulfonate, O,O-diisopropyl s-diethyldithiocarbamoyl phosphorodithioate, 2,4-dimethylbenzyl 2,2-dimethyl-3-(2-methylpropenyl)cyclopropanecarboxylate, O,O-dimethyl-S-2-(acetylamino)-ethyl dithiophosphate, N-dimethylamino succinamic acid, 1,1-dimethyl-3-[3-(n-tert-butyl-carbamoyloxy)phenyl]urea, O,O-dimethyl s-carboethoxymethyl phosphorothioate, O,O-dimethyl O-(3-chloro-4-nitrophenyl) phosphorothioate, O,O-dimethyl-o-p-cyanophenyl phosphorothioate, o,o-dimethyl-s-[5-ethoxy-1,3,4-thiadiazol-2(3H)-onyl-(3)-methyl]phosphorodithioate, N,N-dimethyl-N'-(2-methyl-4-chlorophenyl)-formamidine hydrochloride, O,O-dimethyl o-(4-nitro-m-tolyl) phosphorothioate, o,s-dimethyl tetrachloro thiotere-phthalate, 4'-dimethyltriazenoacetanilide, dinitrocyclohexylphenol, 2,4'-dinitro-4-trifluoromethyl diphenylether, 2-(1-methyl-n-heptyl)-4,6-dinitrophenyl crotonate, N,N-dimethyl-2,2-diphenylacetamide, diphenylamine, 2,6-dinitro-N,N-di-n-propyl-p-toluidine, di-n-propyl-2,5-pyridine-dicarboxylate, 1,1'-ethylene-2,2'-dipyridinium dibromide, 2,3-dicyano-1,4-dithia-anthraquinone, 3-(3,4-dichlorphenyl)-1,1-dimethyl-urea, n-dodecylguanidine acetate, 2-(2,4,5-trichlorophenoxy)ethyl-2,2-dichloropropionate, ethoxymethylbis(p-chlorophenyl) carbinol, 1,2-dihydro-6-ethoxy-2,2,4-trimethylquinone, 3-phenyl-1,1-dimethylurea trichloroacetate, O,O-dimethyl S-(N-formyl-N-methylcarbamoyl-methyl)phosphorodithioate, 2-formyl-4-chlorophenoxyacetic acid, 3-furfuryl-2-methyl-4-oxo-2-cyclopenten-1-yl chrysanthemunate, 2-heptadecyl-2-imidazoline, 7-chloro-4,6-dimethoxycoumaran-3-one-2-spiro-1'-(2'-methoxy-6'-methylcyclohex-2'-en-4'-one), 1,1,1,3,3,3,-hexachloro-2-propanone, 1,5a,6,9,9a,9b-hexahydro-4-a (4H)-dibenzofuran-carboxaldehyde, 9-(p-n-hexyloxyphenyl)-10-methyl-acridinium chloride, 2-hydroxymethyl-4-chloro-phenoxyacetic acid, N-hydroxymethyl-2,6-dichlorothiobenzamide, Isopropyl N-phenylcarbamate, isobutyl triphenylmethylamine, 5-bromo-3-isopropyl-6-methyluracil, isopropyl-4,4'-diboromobenzilate, isopropyl 4,4'-dichlorobenzilate, isorpropyl mercaptophenyl-acetate, O,O-dimethyl phosphorodithioate, 3-cyclohexyl-6,7-dihydro-1H-cyclopentapyrimidine-2,4(3H,5H)-dione, 3-(3,4-dichlorophenyl)-1-methoxy-1-methylurea, S-[1,2-bis(ethoxy-carbonyl)ethyl]O,O-dimethyl phosphorodithioate, 4-chloro-2-methylphenoxyacetic acid, 2-(4-chloro-2-methylphenoxy) propionic acid, sec-butyl 4 (or 5)-chloro-2-methylcyclohexanecarboxylate, s-[(4,6-di-amino-s-triazine-2-yl)methyl]O,O-dimethyl phosphorodithioate, 2-isopropylamino-4-(3-methoxypropylamino)-6-methylthio-s-triazine, 1,1,1-trichloro-2,2-bis(p-methoxyphenyl)ethane, 2-methoxy-4-isopropylamino-6-diethylamino-s-triazine, S-(N-methoxymethylcarbamoylmethyl) dimethyl phosphorothiolothiononate, alpha-methylbenzyl 3-(dimethoxy-phosphinyloxy)-cis-crotonate, m-(1-methyl butyl)phenyl methyl-carbamate, methyl-2-chloro-9-hydroxyfluorene-(9)-carboxylate, 3,3'-methylenebis(4-hydroxycoumarin), 2,2'-methylenebis(3,4,6-trichlorophenol), 6-methyl-2-oxo-1,3-dithio(4,5-b)quinoxaline, O,O-dimethyl S-(2,5-dichlorophenyl-thio)-methyl phosphorodithioate, 3(2-methylpiperidino)propyl-3,4-dichlorobenzoate, 4-(methylsulfonyl)-2,6-dinitro-n,n-dipropylaniline, methyl-2,3,5, 6-tetrachloro-n-methoxy-n-methylterephthalamate, O-methyl O-(2,4,5-trichloro-phenyl) amidophosphorothiomate, 3-(p-bromophenyl)-1-methyl-1-methoxyurea, 1,2-dihydropyridazine-3,6-dione, 3,3'-ethylenebis-(tetrahydro-4,6-dimethyl-2H-1,3,5-thiadiazone-2-thione), S-ethyl hexahydro-1H-azepine-1-carbothioate, 3-(p-chlorphenyl)-1,1-dimethylurea, 3-(p-chlorophenyl)-1,1-dimethylurea trichloroacetate, 1,2-dibromo-2,2-dichloroethyl dimethyl phosphate, beta-naphthoxyacetic acid, 3-(3,4-dichlorophenyl)-1-methyl-1-n-butylurea, 3-(hexahydro-4,7-methanoindan-5-yl)-1,1-dimethylurea, N-1-naphthyl-phthalamic acid, p-chlorophenyl p-phenyl 4-chlorobenzenesulfonate, phenothiazine, ethyl mercapto-phenylacetate O,O-dimethyl-phosphorodithioate, n-phenyl-1-(ethylcarbamoyl-1) ethylcarbamate (d isomer), phosphoric acid, 2-chloro-1-(2,4,5-trichlorophenyl)vinyl dimethyl ester, 4-amino-3,5,6-trichloropicolinic acid, polychlorobenzoic acid, dimethylamine salt, 2,4-bis-(isopropylamino)-6-methoxy-s-triazine, 2-methyl-mercapto-4,6-bis(isopropylamino)-s-triazine, 2-chloro-n-isopropylacetanilide, 2-chloro-4,6-bis(isopropyl-amino)-s-triazine, di-n-propyl-3-methyl-6,7-methylenedioxy-1,2,3,4-tetra-hydronaphthalene-1,2-dicarboxylate, 5-amino-4-chloro-2-phenyl-3(2H) pyridazinone, pyrethrin 1,8-quinolinol, dimethyl 2,4,5-trichlorphenyl phosphorothionate salicylanilide, 1-(3,4-methylene-dioxyphenoxy)-3,6,9-trioxoundecane, sodium 2-(2, 4-dichlorophenoxy)ethyl sulfate, 1-(2-methyl-cyclohexyl)-3-phenylurea, 1-(2,4,5-trichlorophenoxy) propionic acid, N'-chlor-2-methyl-p-valerotoluidide, 1,2-methylenedioxy-4-[2-(octylsulfinyl)propyl]benzene, methyl 3,4-dichlorocarbanilate, 2,4,5-trichlorophenoxyacetic acid, trichlorobenzyl chloride, 2,2-bis(p-chlorophenyl)-1,1-dichloroethane, 3-tert-butyl-5-chloro-6-methyluracil, 2,6-di-tert-butyl-p-tolylmethylcarbamate 2,3,6,7-tetrachloro-4-a,8a-epoxy-1,2,3,4,4a, 8a-hexahydro-14-methanonaphthalene-5,8-dione N-(1,1,2, 2-tetrachloro-ethyl-sulfenyl)-cis-4-cyclohexene-1,2-dicarboximide, 2,4,5,6-tetrachloroiso-phthalonitrile, 1,2,4,5-tetrachloro-3-nitrobenzene, p-chlorophenyl 2,4,5-trichlorophenyl sulfone, 3,4,5,6-tetrahydrophthalimidomethyl 2,2-dimethyl-3-(2-methylpropenyl)cyclopropanecarboxylate, O,O,O',O'-tetramethyl O,O'-thiodi-p-phenylene phosphorothioate, 1,3, 6,8-tetranitrocarbazole, 2-(4-thiazolyl)benzimidazole, 2,2'-thiobis(4,6-dichlorophenol), 2,3-quinoxaline-dithiol cyclic trithiocarbonate, N-meta-tolyl phthalamic acid, S-2,3,3-trichloroallyl N,N-di-isopropyl-thiolcarbamate, O,O-dimethyl (1-hydroxy-2,2,2-trichloroethyl)phosphonate, 2,3,6-trichlorobenzoic acid, trichlorobenoic acid, dimethylamine salt, 4, 5,7-trichlorobenzthiadiazole-2,1,3,2,3,6-trichlorobenzyloxypropanol, N-trichloromethylthio-benzothiazolone, N-trichloromethylthiobenzoxazolone, 2,2,2-trichloro-n-(pentachloro-phenyl)acetimidoyl chloride, 2-(2,4,5-trichlorophenoxy)ethyl sulfate, sodium salt, N,N'-N"-trichloro-2,4,6-triamine-1,3,5-triazine, 2-chloro-4-(di-ethylamino)-6-(ethylamino)-s-triazine, 3,5-dinitro-o-toluamide, and mixtures thereof; and having a Ω value of between about 0.01 and 0.5, a Z parameter for vinyl or aromatic compounds of between about 0.01 and 0.08, and an LD50 value of greater than 200 mg/kg body weight against rats or mice, where χ is the weight fraction of heteroatoms contained in the monomer or monomer repeat unit of the anti-fouling agent, Z is the weight fraction of .pi. electrons contained in the monomer or monomer repeat unit of the anti-fouling agent, and LD50 is the lethal oral dose of the anti-fouling agent which is expected to kill 50% of the population of a test group of adult male rats or mice.

The second antifouling principle by which foul release, does not use or rely upon biocides to prevent or reduce marine fouling, instead it relies on a "non-stick" principle. Foul release coatings are used to hinder marine growth from attaching to the surface of marine elements. Foul release coatings function by making the surface more smooth, slippery, low friction, and/or hydrophobic, which can inhibit marine growth. If any marine organisms do settle on the coated surface they will normally adhere only weakly and can usually be easily removed. Most foul release coatings are based on silicone or fluoropolymer technology. In addition to reducing or inhibiting marine growth a foul release material can impart lubricity to the surface of the marine element.

The foul release coating can be or include silicon compounds such as polydimethylsiloxane, silicone oil, and fluorine-containing compounds such as carbon fluoride, and polytetrafluoroethylene. The foul release coating can be or include silicone rubber, room temperature vulcanized silicone rubber, curable organopolysiloxane, and curable polyorganosiloxane. For example, the coating can include a curable polyorganosiloxane, a curing agent to cure the polyorganosiloxane to a silicone elastomer, a polyisocyanate, and a compound having more than one active hydrogen group or hydrolysable to a compound having more than one active hydrogen group that is capable of reacting with the polyisocyanate to form a polyurethane, polyurea, or poly(urethane-urea).

The foul release coating can be or include a polyo, such as, but not limited to polyether polyol, present in an amount of about 45% by weight or more of the coating composition, and an isocyanate, such as, but not limited to 4,4-diphenylmethane diisocyanate present in an amount of about 20% by weight or more of the coating composition.

In one or more embodiments, the one or more antifouling agents, foul release coatings, or both can be applied to at least a portion of a marine element by any suitable method in any suitable shape or form. The term "marine element," as used herein, refers to any underwater structure, tubular, or conduit. Illustrative marine elements can include but are not limited to fairings; strakes; shrouds; subsea pipelines; drilling import and export risers; boat hulls; tendons for tension leg platforms; anchoring lines; cables and other umbilical elements; legs for fixed and compliant platforms; and other components used in offshore operations. The term "offshore," as used herein, refers to any type of aquatic environment, whether fresh, brackish, or salt water. The term "operation," as used herein, refers to any type of offshore operation, whether permanent, temporary or periodic, fixed or mobile.

The antifouling agent can be applied, attached, or otherwise disposed about the marine element as a solid. In one or more embodiments, the antifouling agent can be in the form of a thin film, bar, rod, particulate, flake, granule, wire, screen, or mesh. The antifouling agents can be disposed on or about a marine element using adhesives or glues, screws, nuts and bolts, rivets, clips, straps, wire, string, springs, lock rings, tie wraps, cotter pins, and welding, or any other suitable means.

The one or more antifouling agents can be disposed within the interstices of a screen or mesh. The screen or mesh can be made from any suitable material, such as a metal or plastic. The suitable mesh can be a polymeric material, such as polypropylene, polyethylene, nylon, poly vinyl chloride, and polytetrafluoroethylene. The one or more antifouling agents which can be disposed within at least a portion of the interstices of the screen or mesh can be force fitted, glued, welded, embedded, or otherwise secured. The screen or mesh having one or more of the antifouling agents disposed within at least a portion of the interstices can be disposed on or about to the marine element using adhesives or glues, screws, nuts and bolts, rivets, clips, straps, clamps, wire, string, springs, lock rings, tie wraps, cotter pins, welding, and/or any other suitable means. The screen or mesh can first be disposed on or about the marine element and then the one or more antifouling agents can be placed within a least a portion of the screen or mesh interstices.

In one or more embodiments, the marine element, such as a fairing, strake, or shroud can be made from the one or more antifouling solids. The marine element can be cast, extruded, pressed, rolled, welded, molded, or otherwise shaped from the one or more solid antifouling agents, such as the metals and metal alloys discussed above.

In one or more embodiments, the one or more antifouling agents can be mixed or otherwise embedded/impregnated within the one or more materials used to fabricate the marine element to provide a marine element having the one or more antifouling agents embedded about and/or within. For example, a marine element can be made from polymeric material. The one or more antifouling agents can be mixed with the polymeric material, which can then be formed and cured into the proper shape.

The antifouling agent can be applied or otherwise disposed about at least a portion of the surface of the marine element as a coating. The coating can be, but is not limited to a paint, paste, lacquer, laminate, wax, gel, epoxy, and resin. The one or more antifouling agents can be mixed or otherwise disposed within the coating material before or after applying the coating. The one or more antifouling agents having a suitable size, such as a particulate, flake, or granule can be mixed with, for example, a paint, which can then be applied to at least a portion of the surface of the marine element.

The coating can be applied to at least a portion of the marine element using any suitable method. Suitable methods for applying a coating can include, but are not limited to airless spraying, conventional spraying, electrostatic spraying, rolling, brushing, dip coating, dip/drain coating, dip/spin coating, coil-coating, flow-coating, high velocity oxygen fuel spray, plasma coating, plasma transferred arc, powder coating, or vacuum impregnation.

The coating can be made from one or more of the antifouling agents which can include a metal, metal alloys, or both as discussed and described above to provide a metallized coating. The metallized antifouling coating can be applied to at least a portion of the marine element using any suitable method. Suitable methods for applying a metallized antifouling coating can include, but are not limited to wirespray, powder spray, electric arc spraying, hot-dip, or electrophoretic deposition.

An antifouling based coating system can use a binder and solvent and optionally other materials. The solvent can be an organic compound or water. The one or more antifouling agents can be suitable for use in both solvent and water based coatings. Any conventional binder can be used in the marine antifouling coating incorporating one or more antifouling agents. Suitable binders can include, but are not limited to polyvinyl chloride in a solvent based system; chlorinated rubber in a solvent based system; acrylic resins in solvent based or aqueous systems; vinyl chloride-vinyl acetate copolymer systems in aqueous dispersions or solvent based systems; butadiene-styrene rubbers; butadiene-acrylonitrile rubbers; butadiene-styrene-acrylonitrile rubbers; drying oils such as linseed oil; asphalt; epoxies; siloxanes; and the like.

In one or more embodiments, the biocidal antifouling agent release can include, but is not limited to a rosin-based system. The rosin-based system can include contact leaching, controlled depletion polymer (CDP); self-polishing copolymer (SPC), and a hybrid SPC/CDP. The rosin-based system can include a low quantity of resin (contact leaching) or high quantity or resin (CDP). The contact leaching antifouling agents can be hard, lack polishing characteristics, and can typically provide antifouling protection for about two years. The SPC can be an acrylic copolymer which can undergo hydrolysis or ion exchange in water which can cause the biocide to release. The SPC system can provide antifouling protection for five years or longer. The hybrid SPC/CDP biocidal antifouling system combines the SPC and CDP technologies.

In one or more embodiments, the biocidal antifouling agent release can include, but is not limited to a coating having one or more of the antifouling agents disposed within or on the coating. Illustrative examples of types of coating systems can be ablative, sloughing, modified epoxy, and vinyl, and hard.

An ablative based coating system gradually and constantly wears away, providing a new, exposed surface of the one or more antifouling agents. An ablative coating is partially soluble so it gradually wears away as small particulates as a result of chemical reactions with the water, the scouring action of the water on the hull, or both. Advantages of ablative coatings include that it remains 100 percent effective as long as the paint remains and it can retain the antifouling properties after extended periods of exposure to air (e.g. when the marine element is removed from the marine environment).

Sloughing coatings are similar to ablative paint in that it will constantly wear away. However, sloughing coatings use a softer binder than ablative paints and therefore, tend to slough or fall off in flakes rather than very small particles or amounts at a time, as an ablative paint does. Due to the faster rate of wear sloughing based coatings will become ineffective faster than an ablative coating and the antifouling properties are reduced rather quickly if exposed to air.

Modified epoxy based coating systems can contain solid particulates of one or more of the antifouling agents, such as copper or copper alloys that wear away rather than the epoxy coating. For example, copper particles in the epoxy coating can gradually dissolve and allow the water to penetrate deeper and deeper into the epoxy layer until all the copper is depleted, at which time a new antifouling layer can be applied. Similar to sloughing based coatings, if the marine element the antifouling modified epoxy coating is disposed on is exposed to air the antifouling properties can be reduced rather quickly.

Vinyl based coating systems are similar to modified epoxy coatings in that the vinyl coating can contain solid particulates of one or more of the antifouling agents. However, vinyl based coating systems develop a hard smooth finish that can be polished or burnished for a very smooth surface. Similar to sloughing and modified epoxy based coatings, if the marine element the antifouling vinyl coating is disposed on is exposed to air the antifouling properties are reduced rather quickly.

The coatings, in addition to one or more of the antifouling agents can include, in particular, one or more binders. Illustrative binders for use in a solvent based system can be, but are not limited to polyvinyl chloride in a solvent system, chlorinated rubber in a solvent system, and acrylic resins in a solvent system. Illustrative binders for use in an aqueous based system can be, but are not limited to vinyl chloride/vinyl acetate copolymer systems in the form of aqueous dispersions or in the form of organic solvent systems, butadiene/styrene/acrylonitrile rubbers, drying oils such as linseed oil, resin esters or modified hardened resins in combination with tar or bitumens, asphalt and epoxy compounds, small amounts of chlorine rubber, chlorinated polypropylene and vinyl resins.

The coatings that can contain one or more of the antifouling agents can also contain one or more of the following: inorganic pigments, organic pigments, colorants or dyes, and/or controlled release materials such as rosin. Water based coatings can also contain: coalescents, dispersants, surface active agents, rheology modifiers, or adhesion promoters. Solvent based coatings can contain extenders, plasticizers, and/or rheology modifiers.

A typical coating can contain from about 2% to about 20% binders, up to about 15% rosins/modified rosins, from about 0.5% to about 5% plasticizers, from about 0.1% to about 2% antisettling agent, from about 5% to about 60% solvent/diluent, up to about 70% cuprous oxide, up to about 30% pigments (other than cuprous oxide) and up to about 15% one or more of the antifouling agents.

While not inclusive, some commercially available antifouling coatings that can be used include International Paint's Micron 66, Micron Extra, Micron Extra VOC, Micron CSC, Fiberglass Bottomkote ACT with Irgarol®, Ultra™ with Biolux™, Ultra-Kote, Fiberglass Bottomkote with Irgarol®, Fiberglass Bottomkote Aqua, Trilux Prop and Drive Aerosol, Bottomkote, VC 17m Extra with Biolux, VC Offshore, Trilux 33; Pettit's Trimidad, Ultima SR, Horizons, Hydrocoat, Vivd, and Alumacoat SR; Flag Paint and Finishes Flag Cruising Antifouling, Flag Cruising Extra Fouling, Flag CopperQuick Antifouling, and Flag Performance Extra Antifouling; Seajet's Seajet Speed, Seajet 034 Emperor, Seajet Platinum, Seajet 037 Coasta, Seajet 033 Shogun, Seajet 032 Shogun Eco, and Seajet 036 Shogun Eco; and Newport Marine Technology's Newport 77 and Newport 88.

While not inclusive, some commercially available foul release agents that can be used include International Paint's Intersleek 425, Intersleek 700, Intersleek 900, Intersleek 970, and VC Performance Epoxy; MicroPhase Coatings, Inc. PhaseCoat UFR® and PhaseCoat Bare Bottom, ePaint's® EP-2000 and EP-ZO, and PPG's ABC® Release 670 and ABC® Release 671. An illustrative foul release coating system called the duplex silicone coating system developed by the Naval Research Laboratory can also be used.

The antifouling bio-jelly producing agents discussed above can be incorporated into an appropriate coating composition and applied to the surface of a marine element. For example, the antifouling bio-jelly agent of having the formula of compound (IV) discussed above can be used as an antifouling paint by adding one or more of the antifouling agents to any suitable paint composition for application to the surface of an aquatic structure. The antifouling bio-jelly agent having the formula (IV) can be dissolved or dispersed into an appropriate solvent and if desired, a binder resin can be added.

Illustrative binder resins for use coatings which can contain a bio-jelly producing agent can include, but are not limited to acrylic, polyester, alkyd, vinyl, epoxy, urethan and urea resins. The amount of the compound of formula IV can be 3-70%, more preferably 5-50% by total weight of solid components of the paint. The antifouling coating that includes one or more compounds having the formula (IV), can, in addition to the antifouling agent and the binder, contain any suitable diluent, such as water, alcohol, alkyl glycol, cellosolve, acetate, xylene, toluene and ketone; loading agent such as talc; coloring agent and curing agent. In addition, the antifouling paint can include one or more compounds having the formula (IV) can include known antibiotics, pesticides or herbicides within the range which do not affect the antifouling activity of the compound of formula (IV). Unlike the biocidal antifouling agents, the antifouling bio-jelly producing agent does not become an environmental hazard.

In one or more embodiments, one of the one or more of the antifouling agents can be an antifouling system known by the trade name Cuprotect™. Cuprotect™ is not paint, but is rather an antifouling control system that uses the metallurgical, non corroding properties of copper and copper alloys to provide bio-fouling protection. Cuprotect™ can have a first layer ("epoxy resin") to provide a durable, stable base with a strong bond to a substrate (i.e., a marine element). A second layer ("binder layer"), which can include one or more thixotropic agents can be applied to the first layer to improve bonding between the first layer and a third layer, and the third layer, which can inhibit or prevent marine growth.

In one or more embodiments, the first layer can include, but is not limited to, an epoxy resin having a weight average molecular weight less than or equal to 700, bisphenol-F epoxy resin, alkylglycidyl ether, and butanedioldiglycidyl ether. The composition of the first layer can be about 60% to about 100% epoxy resin, about 30% to about 60% bisphenol F epoxy resin, about 5% to about 10% alkylglycidyl ether, and about 1% to about 5% butanedioldiglycidyl ether.

In one or more embodiments, the second layer can include, but is not limited to, an epoxy resin having a weight average molecular weight less than or equal to 700, bisphenol-F epoxy resin, alkylglycidyl ether, and butanedioldiglycidyl ether. The composition of the first layer can be about 60% to about 100% epoxy resin, about 30% to about 60% bisphenol F epoxy resin, about 5% to about 10% alkylglycidyl ether, and about 1% to about 5% butanedioldiglycidyl ether.

In one or more embodiments, the third layer can include, but is not limited to copper, iron, manganese, and nickel. The third layer can be a copper-nickel alloy. For example, the third layer can be an alloy containing 90% copper and 10% nickel. The third layer can contain minor impurities of iron, manganese, and other metals.

In one or more embodiments, the antifouling agent can be a system that can include a layer of carbon fiber, graphite powder, and binder applied to the surface to be protected against marine growth. A cathode and a power supply can be used to provide an electrolytic reaction that can prevent marine organisms from attaching to the surface. The power supply can be connected by a wire extending from a power supply located on the surface, or from batteries disposed within or about the surface to be protected.

While not inclusive, some commercially available foul release agents that can be used include International Paint's Intersleek 900, Intersleek 700, Intersleek 970, and VC Performance Epoxy; MicroPhase Coatings, Inc. PhaseCoat UFR® and PhaseCoat Bare Bottom, ePaint's® EP-2000 and EP-ZO, and PPG's ABC® Release 670 and ABC® Release 671. An illustrative foul release coating system called the duplex silicone coating system developed by the Naval Research Laboratory can also be used.

The performance of the antifouling agents can be enhanced by combining two or more of the antifouling agents. Thus, any of the antifouling agents discussed above can be combined together to provide an acceptable antifouling agent.

FIG. 1 depicts a schematic of an illustrative vortex-induced vibration reduction device according to one or more embodiments. The vortex-induced vibration ("VIV") reduction device 100 can be formed from a shell 110 having opposing edges 125, 130 that define a gap. The opposing edges 125, 130 can also include one or more fins 140 extending along at least a portion of the length of the opposing edges 125, 130. The fins 140 can extend outwardly in a vertical direction. The longitudinal gap can be configured to allow the shell 100 to snap or otherwise be placed on or around a marine element (not shown).

The shell 110 can be monolithic or fabricated from two or more pieces or sections. The shell 110 can be any cross-sectional shape and have any length. For example, the shell 110 can have a profile or cross-section that is circular, elliptical, polygonal, or oval. Preferably, the shell 110 has a cross-sectional shape that compliments the outer surface of the marine element to be protected.

In one or more embodiments, the diameter of the shell 110 can vary about the length of the shell 110. The diameter of the shell 110 can also remain constant or substantially constant about the length of the shell 110. The diameter of the shell 110 can range anywhere of from about 0.1 m (4 in) to about 1.8 m (6 ft). The diameter of the shell 110 can range anywhere from a low of about 0.05 m (2 in), 0.1 m (4 in), or 0.15 m (6 in) to a high of about 0.6 m (2 ft), 1.2 m (4 ft), or 1.8 m (6 ft).

The length of the shell 110 can vary. For example, the length of the shell 110 can range from about 0.3 m (1 ft) to about 6 m (20 ft). In one or more embodiments, the length of the shell 110 can range from a low of about 0.15 m (0.5 ft), 0.3 m (1 ft), or 0.6 m (2 ft), or 0.9 m (3 ft) to a high of about 1.2 m (4 ft), 1.5 m (5 ft), 1.8 m (6 ft), or 2.4 m (8 ft).

The inner surface 120 of the shell 110 can also include a bearing face 150 formed from a thickened portion of the shell 110 material. The bearing face 150 can extend the circumference of the shell 110 and taper from a thick portion along the back portion 190 of the shell 110 to thinner portions near edges 125, 130. The bearing face 150 can have an outer lip 170 and inner lip 160, which can extend above the inner surface 120. The bearing face 150 can prevent or reduce the thinning of the back portion 190 of the shell 110 as it rotates around the marine element (not shown).

The inner surface 120 of shell 110 can also have one or more grooves, channels, and/or depressions (not shown) disposed about at least a portion of the inner surface 120 of the shell 110. The grooves, channels, and/or depressions can be formed along at least a portion of the length and/or the circumference of the inner surface 120. The grooves, channels, and/or depressions can be of any shape. The grooves, channels, and/or depressions can be any depth suitable to provide an inner surface recessed below the inner surface 120 of the shell 110. For example, the grooves, channels, and/or depressions can be a depth equal to 10%, 20%, 30%, 40%, or 50% the thickness of the shell 110.

The back portion 190 of shell 110 can include one or more apertures or holes 180 spaced vertically down the face of the shell 110. The one or more holes 180 can be of any geometric shape and size. The number of preferred holes 180 can depend on the length and size of the VIV reduction device 100. For example, in a 24 inch long VIV reduction device 100, four holes 180 would be preferred. These holes 180 can facilitate fluid flow to the inside annular space between the shell 110 and the outside surface of the marine element (not shown). The holes 180 can provide for pressure equalization; allow for fluid to reach the bearing face of the shell 110 for lubricating the bearing face with fluid; allow for the flow of fluid to retard marine growth; and to assist in the directional rotation of the shell 110 around the marine element in order to align the VIV reduction device 100 with the current.

The fins 140 can be placed generally at a 120° angle relative to the circumference of a complete circle and hence the circumference of the shell 110. In one or more embodiments, the fins 140 can extend outwardly a distance less than the nominal outer diameter of the shell 110 so as to minimize drag. Because of the fin angles, vortex eddies are formed more distant from the surface of the marine element (not shown) about which the VIV reduction device 100 can be disposed, thus reducing vortex-induced vibration of the marine element. In one or more embodiments, the circumference of shell 110 can be only about 240° of the circumference of a complete circle. The approximate 120° gap in the shell 110 can provide a "snap-on" feature of shell 110

The shell 110 and the fins 140 can be made from any suitable material. The material can be chosen based on the desired physical properties of the shell 110 and fins 140, such as corrosion resistance, density, hardness, ductility, malleability, tensile strength; environmental stresses such as temperature and pressure; as well as economic factors such as cost and availability. For example, the shell 110 can be made from or include a lightweight, rigid, corrosion resistant or anti-corrosive material The shell 110 and fins 140 can be made from the same material or different material. For simplicity suitable materials that can be used for constructing the shell 110 and fins 140 will be discussed only in reference to the shell 110, but the materials are equally suitable as materials of construction for the fins 140.

The shell 110 can be or include plastic or other polymeric material, or a multi-layer fiberglass mat. Suitable polymeric materials can include, but are not limited to, polyurethane, polyethylene, polypropylene, polytetrafluoroethylene, ethylene-tetrafluoroethylene fluoropolymer, vinyl ester resin, polyvinyl chloride (PVC), isophthalic polyester resin, phenolic, copolymers thereof, blends thereof, combinations thereof, or other polymeric materials with suitable flexibility and mechanical properties.

The shell 110 can be made from or include other suitable materials such as any type of metal, concrete, asphalt, ceramic, or combination thereof. Suitable metallic materials can include, but are not limited to, steel, aluminum, steel alloys, stainless steel, stainless steel alloys, aluminum alloys, non-ferrous metals, non-ferrous metal alloys, or combinations thereof. Suitable types of concrete can include, but are not limited to, regular, high-strength, high-performance, self-compacting, shotcrete, pervious, cellular, roller-compacted, air-entrained, ready-mixed, reinforced, or any other type. Suitable types of asphalt can include, but are not limited to, hot mixed, warm mixed, or cold mixed.

In one or more embodiments, the shell 110 can be made from one or more resins, polymers, or epoxies. The one or more resins, polymers, or epoxies can be impregnated or otherwise imbedded with one or more pieces or particles of metal, concrete, asphalt, ceramic, rock, or any combination thereof. Suitable types of rock for impregnation can include igneous, metamorphic, or sedimentary rock.

The shell 110 can be made or otherwise shaped using any suitable method. For example, the shell 110 can be cast, extruded, pressed, rolled and welded, molded, or otherwise shaped from one or more materials. Preferably, the shell is cast molded from polyurethane, polyethylene, polypropylene, polytetrafluoroethylene, ethylene-tetrafluoroethylene fluoropolymer, vinyl ester resin, polyvinyl chloride, isophthalic polyester resin, phenolic, copolymers thereof, blends thereof, combinations thereof.

The fins 140 can be separate components attached or otherwise disposed on the shell 110. The fins 140 can be integrally formed with the shell 110 (i.e. the one or more fins 150 and the shell 110 can be embodied as a single component). The one or more fins 150 can be attached or otherwise disposed on the shell 110 by any known method. Suitable methods can include epoxy or other adhesives, fasteners, rivets, screws, nuts and bolts, or welding. If two or more materials are desired (i.e. one material for the fins 140 and one material for the shell 110), 2K or 3K injection or insert molding techniques can be used.

In one or more embodiments, the shell 110 can be made from fiberglass which can have 138-207 MPa (20-30,000 psi) tinsel strength that is formed as a bi-directional mat or the shell 110 can be formed of vinyl ester resin with 7-10% elongation or polyurethane. The use of such materials can minimize or eliminate corrosion, which can cause the shell 110 to seize up around the marine element it surrounds. In one or more embodiments, the shell 110 can be made from a solid that exhibits antifouling properties. For example, the shell 110 can be made completely or partially, from a metal such as copper, or a copper alloy that exhibits antifouling properties.

In one or more embodiments, one or more of the antifouling agents can be disposed on, in, or about at least a portion of the shell 100, the fins 140, or both. One or more of the anti-fouling agents can be disposed on the shell 110, the fins 140, or both, prior to installation, during installation, or after installation. One or more of the antifouling agents can be disposed on, in, or about at least a portion of the shell 100, the fins 140, or both, by any known method or combination of methods. One or more of the antifouling agents can be disposed on, in, or about the shell 110, the fins 140, or both, such that the one or more antifouling agents are not in direct contact with the marine element upon which the VIV reduction device 100 can be disposed. One or more of the antifouling agents can be applied in any form and in any manner herein described to any surface of the VIV reduction device 100.

One or more of the antifouling agents can be applied to at least a portion of the outer surface 115, inner surface 120, outer bearing face wall 170, inner bearing face wall 160, bearing face 150, opposing edges 125, 130, and/or fins 140. One or more of the antifouling agents can be embedded or otherwise disposed within the material used to construct the VIV reduction device 100. One or more of the antifouling agents can be applied to or disposed within the one or more grooves, channels, and/or depressions (not shown), which can be disposed along the inner surface 120 of shell 110 without directly contacting the marine element about which the VIV reduction device 100 can be disposed.

Figure 2:
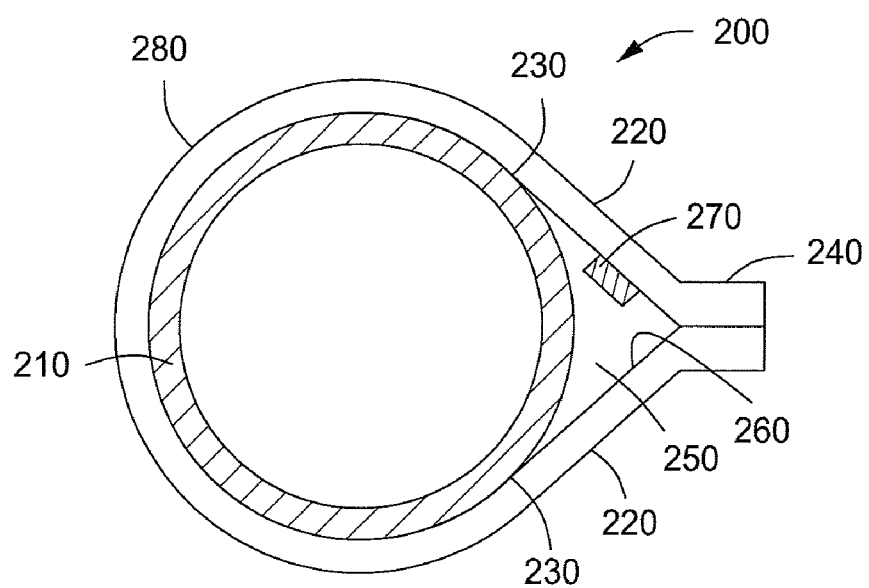
FIG. 2 depicts an illustrative cross-sectional view of a marine element having a vortex-induced vibration reduction device disposed thereon, according to one or more embodiments described.

FIG. 2 depicts an illustrative cross-sectional view of a marine element having a vortex-induced vibration reduction device disposed thereon, according to one or more embodiments. In one or more embodiments, the VIV reduction device 200 can be secured in a fixed, non-rotative position about a marine element 210, such as a riser. In one or more embodiments, the VIV reduction device 200 can be installed to weathervane or rotate about the marine element 210. The VIV reduction device 200 can wrap about or track the exterior of the marine element 210 for about 270 degrees or more. The sides 220 of the faring 200 can depart from the exterior of the marine element 210 at points of departure 230 to converge at the beginning of a tail 240. The sides 220 of the VIV reduction device 200 can be secured using one or more fasteners (not shown) to secure the VIV reduction device 200 about the marine element 210. The sides 220 can be straight, curve convexly, curve concavely, or converge in combinations thereof. An annulus 250 can be formed between the sides 220 and the marine element 210. The VIV reduction device 200 can be made using the materials and methods discussed and described above with reference to VIV reduction device 100 in FIG. 1.

In one or more embodiments, one or more grooves, channels, recesses, and/or depressions (not shown) can be disposed about at least a portion of the inner surface 260 of the VIV reduction device 200. The grooves, channels, recesses, and/or depressions can be formed along at least a portion of the length or along at least a portion of the circumference of the inner surface 260. The grooves, channels, and/or depressions can be of any shape and depth suitable to provide a surface recessed below the inner surface of the VIV reduction device.

In one or more embodiments, one or more of the antifouling agents can be disposed on, in, or about at least a portion of the VIV reduction device 200. In one or more embodiments, one or more of the antifouling agents can be applied to the inside surface 260, which can inhibit or prevent marine growth within the annulus 250. One or more of the antifouling agents can be disposed on the tail 140, inner surface 260, and/or outer surface 280. One or more of the antifouling agents in the form of a solid (e.g. a bar, wire, or impregnated mesh) can be disposed within the annulus 250. For example, one or more of the antifouling agents in the form of a rectangular bar 270 can be disposed within the annulus 250 by attaching the bar 270 to the inside wall 260 of the VIV reduction device 200. The one or more grooves, channels, and/or depressions (not shown), can provide a recessed surface on which one or more of the antifouling agents can be disposed. The one or more recessed surfaces within the grooves, channels, and/or depressions can allow one or more of the antifouling agents to be disposed on the recessed inner surface 260 of the VIV reduction device 200 without directly contacting the marine element 210.

Figure 3:
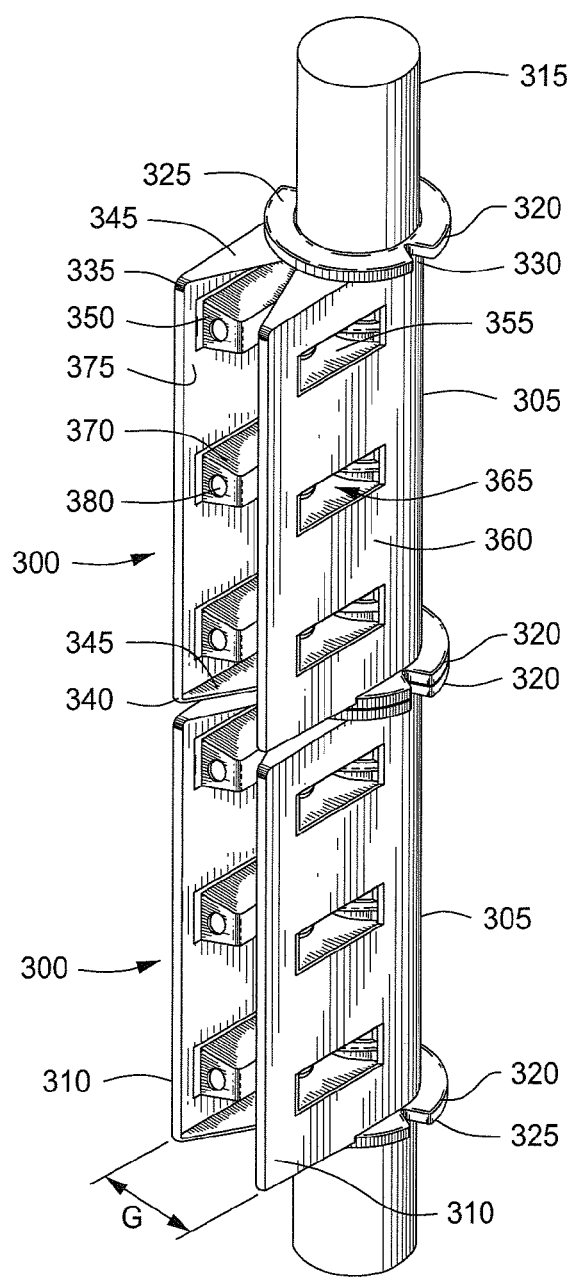
FIG. 3 depicts a schematic view of a marine element having a series of illustrative vortex-induced vibration reduction devices disposed thereon, according to one or more embodiments described.

FIG. 3 depicts a schematic view of a marine element having a series of illustrative vortex-induced vibration reduction devices disposed thereon, according to one or more embodiments. The VIV reduction device 300 can be formed from a cylindrical shell 305 having opposing fins 310, extending outwardly in a vertical direction, that define a longitudinal gap G. For example, VIV reduction device 300 can be a U-shaped cylindrical shell 305 with opposing edges defining the longitudinal gap. In one or more embodiments, parallel fins 310 can extend outwardly from the opposing edges of the shell 305. In one or more embodiments, the spaced apart fins 310 can be parallel to each other relative to the center of the circle defining the shell 305 and hence the circumference of the shell 305. In one or more embodiments, the spaced apart fins 310 can be tapered and thus, the distance between the opposing fins 310 can be decreased. The gap G in the shell 305 can provide an opening that allows for placement of the shell 305 around a marine element 315, such as a riser.

The VIV reduction device 300 can include one or more flanges 320. For example, two flanges 320 can be disposed on the shell 305, with one flange 320 disposed at each end of the VIV reduction device 300. The bearing surfaces 325 can allow each VIV reduction device 300 to freely rotate on an adjoining bearing surface 325 of flange 320 of an adjacent VIV reduction device 300. Although not shown, the flanges 120 can also have a second bearing surface or face (see FIG. 1) which can complement the marine element 315. The second bearing surface or face can extend the circumference of the shell 305 and can extend inwardly from the diameter of the shell 305 to provide an annular space between the inner wall (not shown) of the shell 305 and the marine element 305. The second bearing surface can prevent or reduce thinning of the inner surface of the shell 305 as the VIV reduction device 300 rotates around the marine element 315.

The one or more flanges 320 can extend around the circumference of the shell 305 and extend outwardly from the shell 305 about 3 to 4 inches. The one or more flanges 320 can include at least one V-shaped cutout 330 to act as opening hinges for the VIV reduction device 300. In a preferred embodiment, the V-shaped cutout can be positioned at the 12:00 o'clock, 3:00 o'clock and 9:00 o'clock position of shell 305 in relation to the gap G at the 6:00 o'clock position. Alternatively, the V-shaped cutout can be placed anywhere on the flange 320. The top edge 335 and bottom edge 340 of fins 310 each include a tail section 345 that extends outwardly from the flange 320 at the gap G. The inside edge of each tail section 345 can be angled from the edge of the gap G to the outer edge of each fin 310. The angle can depend on the length of the fin 310.

The fins 310 can also include a first and second connector 350, 355 that form a set of opposed connectors. The connectors 350, 355 can be in parallel alignment with each other. Each fin 310 can include at least one set of connectors 350, 355, preferably three sets, for securing the fins 310 together in order to attach them around the marine element 315. The connectors 350, 355 can extend inwardly from the outside surface 360 of each fin 310, creating a cavity 365 which can include an opening (not shown) for receiving a fastening means. The walls of each connector 350, 355 can taper inward and the opening can be offset from the center of the connector 350, 355 toward the outer edge of fin 310. The cavity 365 of each connector 350, 355 can form a rectangular shaped box 370 that can extend from the inner surface 375 of the fin 310. A cover plate (not shown) can be secured over each of the cavity openings.

The fins 310 via the connectors 350, 355 can be fastened together using male-female connectors, studs, nuts and washers, screws, and any other suitable fastener (not shown). The fasteners can be a male and female connector formed from 70 Shore D polyurethane, 90-95 Shore A polyurethane, or glass reinforced polyethylene, fiberglass or nickel alloy studs, nuts, and washers can be used. In one or more embodiments, the male connector can be placed in one of the connectors 350, 355 and the female connector can be placed in the other connectors 350, 355 and the fasteners can be secured together, thereby drawing the fins 310 together, and thus the VIV reduction device 300 around marine element 315. The connectors 350, 355 can include one or more holes 380 for accessing the fastening means. The VIV reduction device 300 can be made from the same materials discussed in reference to VIV reduction device 100 in FIG. 1.

One or more grooves, channels and/or depressions (not shown) can be disposed about at least a portion of the inner surface 375 of the VIV reduction device 300. The grooves, channels, or depressions can be formed along at least a portion of the length or along at least a portion of the circumference of the inner surface 375. The grooves, channels, and/or depressions can be of any shape and depth suitable to provide a surface recessed below the inner surface of the VIV reduction device.

The shell 305 can have an outer diameter of D and fins 310 can have a distance between the ends of W. When W is equal to D the fins are parallel. It has been found that if W decreases relative to D, i.e. the fins 310 are tapered, the drag forces exerted on the VIV reduction device reduced. The VIV reduction device 300 can be formed from a cylindrical shell 305 having opposing fins 310, extending outwardly in a vertical direction, that define a longitudinal gap G. However, rather than being parallel, fins 310 can be tapered and thus, the distance of W is decreased between the opposing edges of the fins 310. The placement of the fins 310 can be from W=D (parallel) to W=75% of D (tapered). Any decrease of W in relation to D, will result in tapering of the fins 310. A preferred ratio is W=25% of D which is about a 12.5% reduction for each fin 310, resulting in a 25% decrease in W with respect to D.

The VIV reduction devices 300 can range in height from about 0.6 m (2 ft) to about 3.7 m (12 ft) and can have a diameter of about 0.15 m (0.5 ft) to 1.2 m (4 ft). The shell 305 can be rotatably mounted about a substantially cylindrical marine element 315, such as a riser, and rotate around the marine element 315 to match the fins 310 with the direction of the current.

The fins can be placed in a direction parallel with the fluid current in order to move the boundary layer vortex eddies further away from the marine element 315 without adding significant drag. Fins 310 can be any length, however, regardless of the length, the fins 310 do not extend beyond the nominal outer diameter of the shell 305. Preferably, VIV reduction device 300 has dimensions of length to diameter (shell diameter) such that the length to diameter ratio or aspect ratio is in the range of 1.50 to 2.50, preferably equal to or greater than 1.75 to 2.0.

The shell 305 can be configured to fit around the marine element 315 such that the VIV reduction device 300 provides for pressure equalization; allows for fluid to reach the bearing face of the shell 305 for lubricating the bearing face with fluid; and to allow for the flow of fluid to retard marine growth. The configuration of the shell also can assist in the directional rotation of the shell 305 around the marine element 315 in order to align the VIV reduction device 300 with the current. In one or more embodiments, a VIV reduction device system is contemplated in which a number of VIV reduction device segments 300 can be installed on the marine element 315 to rotate independently along a longer elongated element. In one or more embodiments, the bearing surfaces 325 of the flanges 320 allow each VIV reduction device 300 to freely rotate on the adjoining flanges 325.

One or more of the antifouling agents can be disposed on the inner surface 375 and/or outer surface 360 of the shell 305. One or more of the antifouling agents can be disposed in, on, or about the shell 305, fins 310, flanges 320, connectors 350, 355, and connectors (not shown). One or more of the antifouling agents can be disposed on or within the one or more grooves, channels, and/or recesses (not shown). The one or more grooves, channels, and/or depressions can allow one or more of the antifouling agents to be disposed on the recessed surface of the VIV reduction device 300 without directly contacting the marine element 300. The fasteners (not shown) can be made from, coated, with, embedded with, or otherwise include one or more of the antifouling agents. One or more of the antifouling agents can be disposed on or within the cavity 365. One or more of the antifouling agents can be disposed on, in, or about the one or more flanges 320, bearing surfaces 325, and/or the second bearing surfaces (not shown). One or more of the antifouling agents can be disposed on, in or about the optional cover plate (not shown) which can be used to cover the cavity 365.

Figure 4:
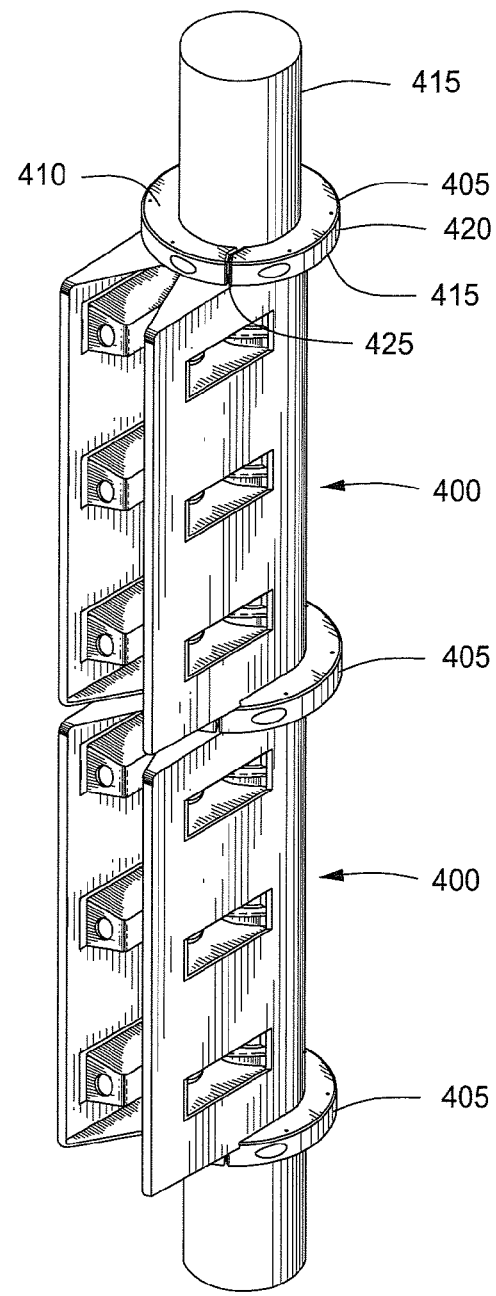
FIG. 4 depicts another schematic view of a marine element having a series of illustrative vortex-induced vibration reduction devices disposed thereon, according to one or more embodiments described.

FIG. 4 depicts another schematic view of a marine element having a series of illustrative vortex-induced vibration reduction devices disposed thereon, according to one or more embodiments. The VIV reduction device 400 can be as discussed and described above with reference to the VIV reduction device 300 shown in FIG. 3. In one or more embodiments, each VIV reduction device 400 can be separated by a two-section circular collar 405 configured such that it allows each VIV reduction device 400 to freely rotate on the collar 405. The collar 405 can have a top surface 410, a bottom surface 415, an outer surface 420, an inside surface (not shown), and two end sections 425. The collar 400 can be any height, for example in one embodiment it can be about 7.6 cm (3 in). The diameter of the collar 405 can depend upon the diameter of the marine element 415, such as a riser, which the collar 405 can be disposed about. The collar 405 can also include a plurality of annulus spacers (not shown) placed around the inside surface of the collar 405. The annulus spacers can secure the collar 400 to marine element 415 and reduce rotational and axial movement of the collar 405 by inducing hoop stress and providing a frictional surface on marine element 415. The spacers can extend outwardly from the inside surface such that the ID of annulus spacers is smaller than the ID of the collar 405. The number of spacers on each collar will depend upon the circumference of the collar. At least six spacers can be used. The VIV reduction device 400, collar 405, and spacers (not shown) can be made from materials discussed in reference to VIV reduction device 100 in FIG. 1.

One or more of the antifouling agents can be disposed on, about, or in VIV reduction device 400 as discussed in reference to VIV reduction device 300 in FIG. 3. One or more of the antifouling agents can be disposed on, in, or about the collar 405. One or more of the antifouling agents can be disposed on the top surface 410, bottom surface 414, outside surface 420, inside surface (not shown) and/or end sections 425. In one or more embodiments, the plurality of annulus spacers (not shown) can be coated with or made from one or more of the antifouling agents.

Figure 5:
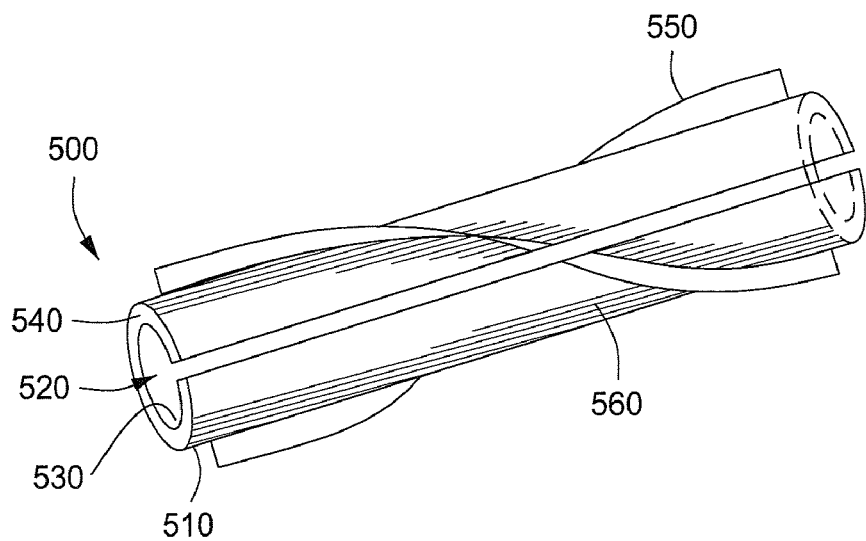
FIG. 5 depicts another illustrative vortex-induced vibration reduction device according to one or more embodiments described.

FIG. 5 depicts another illustrative vortex-induced vibration reduction device according to one or more embodiments. The VIV reduction device 500 can have a body 510, and one or more fins 150 attached or otherwise disposed on an outer surface 560 or diameter of the body 510. The VIV reduction device 500 can have a longitudinal gap or slot extending along the length of the body 510. The gap or slot can enable the VIV reduction device 500 to expand circumferentially to allow installation about a marine element (such as during placement on a pipe or riser).

The body 510 can be monolithic or fabricated from two or more pieces or sections. The body 510 can be any cross-sectional shape and have any length. For example, the body 110 can have a profile or cross-section that is circular, elliptical, polygonal, or oval. Preferably, the body 510 has a cross-sectional shape that compliments the outer surface of the marine element to be protected. The body 510 can be made using the materials and methods discussed and described above with reference to the VIV reduction device 100 in FIG. 1.

The body 510 can be annular having a bore or aperture 520 formed therethrough. The bore or aperture 520 formed through the body 510 can have any geometric shape and size. For example, the body 510 can be a cylindrical or tubular member having a circular bore or aperture 520 formed therethrough.

In one or more embodiments, the diameter of the bore 520 can vary about the length of the body 510. The diameter of the bore 520 can also remain constant or substantially constant about the length of the body 510. The diameter of the bore 520 can range anywhere of from about 0.1 m (4 in) to about 1.8 m (6 ft). The diameter of the body 510 can range anywhere from a low of about 0.05 m (2 in), 0.1 m (4 in), or 0.15 m (6 in) to a high of about 0.6 m (2 ft), 1.2 m (4 ft), or 1.8 m (6 ft).

The length of the body 510 can vary. For example, the length of the body 510 can range from about 0.3 m (1 ft) to about 6 m (20 ft). In one or more embodiments, the length of the body 510 can range from a low of about 0.15 m (0.5 ft), 0.3 m (1 ft), or 0.6 m (2 ft), or 0.9 m (3 ft) to a high of about 1.2 m (4 ft), 1.5 m (5 ft), 1.8 (6 ft), or 2.4 m (8 ft).

The VIV reduction device 500 can include any number of fins 550 disposed thereon. The number of fins 550 disposed on the VIV reduction device 500 can range from 1 to 200, or from 1 to 150, or from 1 to 100, or from 5 to 60. The fins 550 can be made using the materials and methods discussed and described above with reference to the VIV reduction device 100 in FIG. 1. The one or more fins 550 can be separate components attached or otherwise disposed on the body 510. The fins 550 can be integrally formed with the body 510 (i.e. the one or more fins 550 and the body 510 can be embodied as a single component).

The one or more fins 550 can be attached or otherwise disposed on the VIV reduction device 500 by any known method. Suitable methods can include epoxy or other adhesives, fasteners, rivets, screws, nuts and bolts, or welding. The fins 550 can be integrally formed with the body 510 by, for example, injection molding, insert molding, or rotomolding techniques. If two or more materials are desired, 2K or 3K injection or insert molding techniques can be used.

The one or more fins 550 can be helically arranged or disposed in any pattern about the VIV reduction device 500. The one or more fins 550 can be helically arranged or disposed in any pattern having any frequency or pattern of repetition. The one or more fins 550 can extend over the entire length of the VIV reduction device 500 or any section/portion thereof.

The fins 550 can have a height from about 0.05 D to about 0.5 D. The fins 550 can have a height ranging from a low of about 0.05 D, about 0.1 D, or about 0.15 D to a high of about 0.2 D, 0.25 D, or 0.3 D or more. As used herein "D" refers to the inner diameter of the VIV reduction device 500.

The body 510, and/or the one or more fins 550 can be at least partially made from, include, or have disposed on and/or about at least a portion of any surface or combination of surfaces the one or more of the antifouling agents. For example, the one or more antifouling agents can be disposed on at least a portion of the outer surface 560, inner surface 530, ends 540, fins 550, or any combination thereof. One or more of the antifouling agents can also be embedded or otherwise disposed within the material used to construct any one or more components of the VIV reduction device 500.

Figure 6:
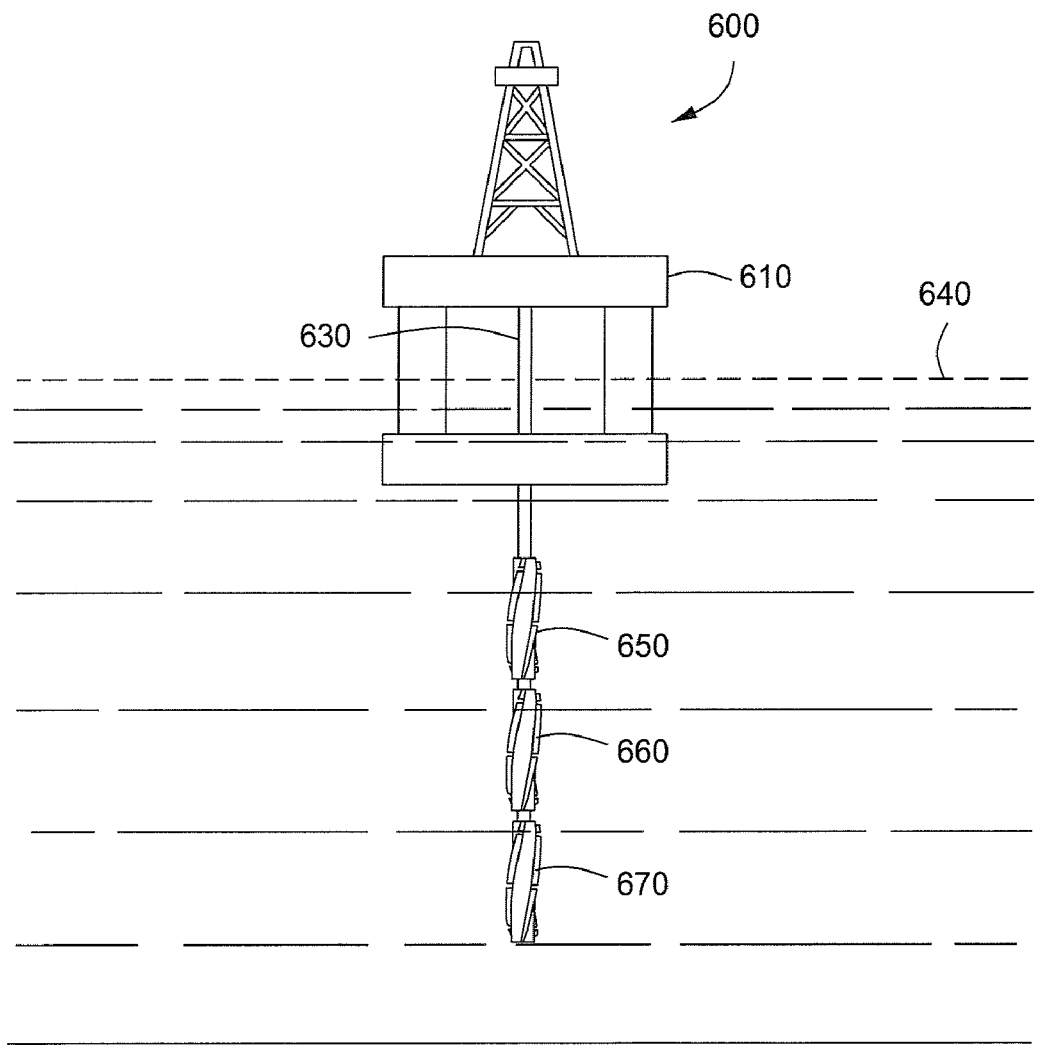
FIG. 6 depicts a schematic of an illustrative offshore operation having at least one marine element fitted with an apparatus for reducing vortex induced vibration, according to one or more embodiments described.

FIG. 6 depicts a schematic of an illustrative offshore operation having at least one marine element fitted with an apparatus for reducing vortex induced vibration, according to one or more embodiments. For simplicity and ease of description, FIG. 6 represents an illustrative VIV reduction device 650, 660, 670 which is commonly referred to as a strake disposed about a marine riser 630. However, any suitable VIV reduction device can equally be disposed about a marine element 630, which can include the fairings 100, 200, 300, 400 and shrouds (not shown) to reduce the effects of vortex-induced vibrations. The offshore operation 600 can include any oil and/or gas production platform 610, any number of marine elements 630 for drilling, production and/or workover operations, and any number of VIV reduction devices 650, 660, and/or 670.

As depicted, three VIV reduction devices 650, 660, 670 or a combination of other VIV reduction devices (not shown) can be installed on the riser 630 in any order. The VIV reduction devices 650, 660, 670 can be installed in contact with one another, i.e. end to end. The VIV reduction devices 650, 660, and/or 670 can also be disposed so that there is a space or distance therebetween. The distance between any two adjacent VIV reduction devices 650, 660, and/or 670 can be the same or can vary. Various factors can determine the distance between two adjacent VIV reduction devices 650, 660, and/or 670. Such factors can include, but are not limited to the size of the VIV reduction device 650, 660, and/or 670, the water current, the distance below the surface to where the VIV reduction device 650, 660, and/or 670 is installed, and the angle or bend of the marine element 630. Suitable spacings between VIV reduction devices 650, 660, 670 can be about 2.5 cm (1 in), or 5 cm (2 in, or 7.6 cm (3 in), to about 25 cm (10 in), 51 cm (20 in), or 194 cm (30 in). Although not shown, spacers, collars, or other devices can be disposed between adjoining VIV reduction devices 650, 660, and/or 670 to maintain proper spacing.

In one or more embodiments, the one or more VIV reduction devices 650, 660, and/or 670 can have the one or more antifouling agents disposed on, in, or thereabout. For example, the VIV reduction device 650 can be made from one or more of the antifouling agents, VIV reduction device 660 can have one or more of the antifouling agents disposed within at least a portion of the body 510 or fins 550 (see FIG. 5), and VIV reduction device 670 can have one or more of the antifouling agents disposed on or about at least a portion of inner surface 530, ends 540, fins 550, and/or outer surface 560. For example, the VIV reduction device 650 can have one or more of the antifouling agents, including a foul release coating disposed about at least a portion of the body 510 and fins 550, the VIV reduction device 660 can have a bio-jelly promoting compound disposed about at least a portion of the body 510 and/or fins 550, and the VIV reduction device 670 can have an antifouling paint containing copper disposed about at least a portion of the body 510 and/or fins 550.

Although depicted as a floating platform, the platform 610 can be of any type, including submersible, semi-submersible, or jackup. In one or more embodiments, the platform 610 can include any number of drilling, operating, and processing equipment (not shown) disposed thereon. Drilling, operating, and processing equipment are well known in the art and can include, for example, a drilling derrick, drilling deck, drill strings, drill risers, one or more cranes, a heliport, operation management facilities, and personnel housing. Although shown and described with reference to a platform 610, the VIV reduction devices 650, 660, 670 are equally effective for use with marine elements 630 extending from a boat or other vessel, e.g. a drilling ship.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A system for reducing vortex-induced vibration and drag about a marine element, the system comprising:
    a shell rotatably mounted about the marine element, the shell having an inner surface defining a plurality of grooves therein and opposing edges defining a longitudinal gap configured to allow the shell to surround at least a portion of the marine element;
    a fin positioned along each opposing edge of the longitudinal gap, each fin extending outwardly from the shell, the fins being positioned on the shell so as to reduce vortex-induced vibration and minimize drag on the marine element; and
    one or more antifouling agents disposed within at least one of the plurality of grooves.

2. The system of claim 1, wherein the shell further includes at least one opening for the flow of fluid, the opening being positioned in the shell opposite the longitudinal gap.

3. The system of claim 1, wherein the shell includes a bearing face extending between the opposing edges of the shell, the bearing face having a thicker portion along a back portion of the shell and a thinner portion near the opposing edges.

4. The system of claim 1, wherein the shell comprises a non-metallic, low corrosive material comprising polyethylene, polyurethane, vinyl ester resin, poly vinyl chloride, fiberglass, or combinations thereof.

5. The system of claim 1, wherein the one or more antifouling agents comprises a metal or metal alloy, wherein the metal is selected from group Ib, Ia, IIb, IIIa, IIIb, IVa, IVb, Va, Vb, VIIb, VIIb, or VIII of the Periodic Table of the Elements.

6. The system of claim 1, wherein the one or more antifouling agents comprises copper, nickel, palladium, platinum, tantalum, tellurium, titanium, beryllium, magnesium, manganese, calcium, silver, gold, zinc, cadmium, mercury, boron, aluminum, molybdenum, scandium, yttrium, silicon, zirconium, tin, arsenic, derivatives thereof, alloys thereof, or combinations thereof.

7. The system of claim 1, wherein the one or more antifouling agents comprises a metal or metal alloy selected from the group consisting of Ib, IIa, IIb, IIIa, IIIb, IVa, IVb, Va, Vb, VIb, VIb, or VIII of the Periodic Table of the Elements, wherein the metal comprises an oxide, carbonate, halide, hydroxide, cyanide, nitrate, nitrite, nitride, sulfate, sulfite, or sulfide.

8. The system of claim 1, wherein the one or more antifouling agents comprises a metal or metal alloy, wherein at least one metal is selected from the group consisting of copper, nickel, palladium, platinum, tantalum, tellurium, titanium, beryllium, magnesium, manganese, calcium, silver, gold, zinc, cadmium, mercury, boron, aluminum, molybdenum, scandium, yttrium, silicon, zirconium, tin, arsenic, lead, and wherein at least one metal comprises an oxide, carbonate, halide, hydroxide, cyanide, nitrate, nitrite, nitride, sulfate, sulfite, or sulfide.

9. The system of claim 1, wherein the one or more antifouling agents comprises one or more aliphatic nitrogen fungicides, amide fungicides, anilide fungicides, acylamino acid fungicides, benzanilide fungicides, furanilide fungicides, sulfonanilide fungicides, benzamide fungicides, furamide fungicides, phenylsulfamide fungicides, sulfonamide fungicides, valinamide fungicides, antibiotic fungicides, strobilurin fungicides, aromatic fungicides, benzimidazole fungicides, benzimidazole precursor fungicides, benzothiazole fungicides, bridged diphenyl fungicides, carbamate fungicides, benzimidazolylcarbamate fungicides, carbanilate fungicides, conazole fungicides, copper fungicides, dicarboximide fungicides, dichlorophenyl dicarboximide fungicides, phthalimide fungicides, dinitrophenol fungicides, dithiocarbamate fungicides, cyclic dithiocarbamate fungicides, polymeric dithiocarbamate fungicides, imidazole fungicides, inorganic fungicides, inorganic mercury fungicides, organomercury fungicides, morpholine fungicides, organophosphorus fungicides, organotin fungicides, oxathiin fungicides, oxazole fungicides, polysulfide fungicides, pyrazole fungicides, pyridine fungicides, pyrimidine fungicides, pyrrole fungicides, quinoline fungicides, quinone fungicides, quinoxaline fungicides, thiazole fungicides, thiazolidine fungicides, thiocarbamate fungicides, thiophene fungicides, triazine fungicides, triazole fungicides, urea fungicides, unclassified fungicides, phenoxy, trichloroacetic acid, ethyl N,N-di (n-propyl)thiolcarbamate and pronamide, carboxylic acid derivatives, phenoxy, phenyl substituted carboxylic acids, phenyl substituted carboxylic acid salts, trichloroacetic acid, trichloroacetic acid salts, carbamic acid derivatives, substituted ureas, substituted triazines, diphenyl ethers, anilides, oxyphenoxy herbicides, uracils, nitriles, dithiopy, thiazopyr, acephate, acethion, acetoxon, aldicarb, aldoxycarb, aldrin, allethrin, allyxycarb, alpha-cypermethrin, amidithion, amitraz, amlure, anethol, azethion, azinphos-ethyl, azinphos-methyl, azocyclotin, *bacillus thuringiensis*, BCPE, bendiocarb, bensultap, benzoximate, benzyl acetate, benzyl benzoate, BHC, bifenthrin, binapacryl, bornyl, BPMC, bromophos, bromophos-ethyl, bromopropylate, bufencarb, buprofezin, butacarb, butocarboxim, butonate, butoxycarboxim, calcium arsenate, carbaryl, carbofuran, carbophenothion, carbosulfan, cartap, chlordane, chlordecone, chlordimeform, chlorfenethol, chlorfenson, chlorfensulphide, chlorfenvinphos, chlormephos, chlorobenzilate, chloropenozide, chlorpropylate, chlorphoxim, chlorpyrifos, chlorpyrifos methyl, chlorthiophos, clofentezine, CPCBS, CPMC, crotoxyphos, crufomate, cryolite, cufraneb, cyanofenphos, cyanophos, cyanthoate, cyfluthrin, cyhexatin, cypermethrin, cyphenothrin, cyromazine, DAEP, DDT, DDVP, deltamethrin, demeton, demeton-S-methyl, demeton-O-methyl, demeton-S, demeton-S-methyl sulfoxid, demephion-O, demephion-S, dialifor, diazinon, dicapthon, dichlofenthion, dicofol, dicrotophos, dieldrin, dienochlor, diflubenzuron, dihydrorotenone, dimefox, dimetan, dimethoate, dimethrin, dinex, dinitrophenol, dinobuton, dinocap, dioxabenzofos, dioxacarb, dioxathion, disparlure, disulfoton, DMCP, DNOC, d-trans allethrin, endosulfan, endothion, endrin, entice, EPBP, EPN, esfenvalerate, ethiofencarb, ethion, ethoate-methyl, ethoprop, etrimfos, fenamiphos, fenazaflor, fenbutatin-oxide, fenitrothion, fenoxycarb, fenpropathrin, fenson, fensulfothion, fenthion, fenvalerate, flubenzimine, flucythrinate, fluenethyl, flufenoxuron, fluvalinate, fonofos, formetanate hydrochloride, formothion, fosmethilan, fosthietan, furathioearb, furethrin, grandlure, heptachlor, HETP, hexythiazox, hydramethylnon, hydroprene, IPSP, isazophos, isobenzan, isofenphos, isoprocarb, isoprothiolane, isothioate, isoxathion, jodfenphos, kinoprene, lead arsenate, leptophos, lethane, lindane, lythidathion, malathion, mazidox, mecarbam, mecarphon, menazon, mephosfolan, methamidophos, methidathion, methiocarb, methomyl, methoprene, methoxychlor, methoxyfenozide, methyl parathion, methyl phencapton, mevinphos, mexacarbate, MIPC, mirex, monocrotophos, MTMC, naled, nicotine, nonachlor, omethoate, ovex, oxamyl, oxydeprofs, oxydisulfoton, oxythioquinox, paraoxon, parathion, paris green, permethrin, perthane, phencapton, phenthoate, phorate, phosalone, phosfolan, phosmet, phosnichlor, phosphamidon, phoxim, pirimicarb, pirimiphos-ethyl, pirimiphos-methyl, plifenate, profenofos, promecarb, propargite, propetamphos, propoxur, prothidathion, prothiophos, prothoate, PTMD, pyridaben, pyridaphenthion, quinalphos, resmethrin, ronnell, rotenone, ryania, salithion, schradan, sodium fluosilicate, sophamide, sulfotepp, sulprofos, tebufenozide, tefluthrin, temephos, TEPP, terbufos, tetrachlorvinphos, tetradifon, tetramethrin, tetrasul, thallium sulfate, thiocarboxime, thiocyclam hydrogenoxalate, thiometon, tolclofos-methyl, toxaphene, triazamate, triazophos, trichlorfon, trichloronate, triflumuron, trimethacarb, vamidothion, and xylylcarb, 3-bethoxazin, copper(II) tetraoxosulfate, cybutryne, dichlone, dichlorophen, endothal, fentin, calcium hydroxide, nabam, quinoclamine, quinonamid, simazine, N-bromoacetamide, calcium arsenate, cloethocarb, copper acetoarsenite, copper sulfate, fentin, metaldehyde, methiocarb, niclosamide, pentachlorophenol, sodium pentachlorophenolate, tazimcarb, thiodicarb, tralopyril, bis (tributyltin) oxide, trifenmorph, trimethacarb, 2-bromo-2-nitropropane-1,3-diol, copper(II) hydroxide, methylphenol, 4,4'-dichloro-2,2'-methylenediphenol, di-2-pyridyl disulfide 1,1'-dioxide, N-[2-(2-dodecylaminoethylamino)ethyl]glycine, sodium (EZ)-4-dimethylaminobenzenediazosulfonate, formaldehyde, .mu.-(2,2'-binaphthalene-3-sulfonyloxy)bis (phenylmercury), bis(8-hydroxyquinolinium) sulfate, IL-1,3, 4/2,5,6-1-deoxy-2,3,4,5,6-pentahydroxycyclohexyl 2-amino-2,3,4,6-tetradeoxy-4-(.alpha.-iminoglycino)-.alpha.-D-arabino-hex-opyranoside, 2-chloro-6-trichloromethylpyridine, 2-octyl-1,2-thiazol-3(2H)-one, 5-ethyl-5,8-dihydro-8-oxo[1,3]dioxolo[4,5-g]quinoline-7-carboxylic acid, (4S,4aR,5S,5aR,6S,12aS)-4-dimethylamino-1,4,4a,5,5a,6, 11,12a-octahydro-3,-5,6,10,12,12a-hexahydroxy-6-methyl-1,1'-dioxonaphthacene-2-carboxamide, 3-allyloxy-1,2-benzothiazole 1,1-dioxide, O-2-deoxy-2-methylamino-.alpha.-L-glucopyranosyl-(1-2)-O-5-deoxy-3-C-form-yl-alpha.-L-lyxofuranosyl-(1-4)-N.sup.1,N.sup.3-diamidino-D-streptamine, 2',3,3',4,5,6-hexachlorophthalanilic acid, a sodium salt of (2-carboxyphenylthio)ethylmercury, derivatives thereof, or mixtures thereof.

10. The system of claim 1, wherein the one or more antifouling agents comprises a bio-jelly producing compound selected from 4'-ethylbenzylidene-4-ethyl aniline, 2'-isopropylbenzylidene-4-butoxyaniline, 4-nonyl benzylideneaniline, 4'-stearylbenzylidene-4-butoxyaniline, benzylidene-4-nonyloxyaniline, 4'-ethylbenzylidene-4-hexylaniline, 4'-ethoxybenzylidene-4-n-octylaniline, 2'-butoxybenzylidene-2-ethylaniline, 4'-naphthyloxy benzylidene aniline, 4'-ethylbenzylidene-4-nitroaniline, 3',4'-diethylbenzylidene-4-butylaniline, terephthalidene-di-4-butoxyaniline, di-4-butoxybenzylidene-p-phenylenediamine, benzylidene-4-n-octylaniline, 4'-nonylbenzylidene-4-methoxyaniline, 4'-ethylhexylbenzylideneaniline, 4',4-oleyloxybenzylidene-aniline, 2'-ethoxy-4'-bromobenzylideneaniline, 4'-hexylbenzylidene-4-octoxyaniline, 4'-nonyloxybenzylidene-4-nonylaniline, 4'-nonylbenzylidene-2-butoxyaniline, benzylideneoctylamine, butylideneaniline, octylidene-4-hexylaniline, octylidene-4-octylaniline, cinnamilideneaniline, cinnamilideneoctylamine, benzylidene aniline, benzylidene-4-chloroaniline, benzylidene-4-bromoaniline, benzylidene-4-nitroaniline, benzylidene-4-hydroxyaniline, 4'-methylbenzylideneaniline, 4'-chloro benzylideneaniline and 2'-hydroxybenzylideneaniline, 2-methylpyridine, 4-ethylpyridine, 4-hexylpyridine, 4-octylpyridine, 4-nonylpyridine, 4-decylpyridine, 4-laurylpyridine, aniline, 4-ethylaniline, 4-hexylaniline, 4-octylaniline, 4-nonylaniline, 4-decylaniline, 4-dodecylaniline, 4-ethylnitrobenzene, 4-octyl benzenesulfonic acid, 4-ethylbenzenesulfonic acid, 4-hexylnitrobenzene, 4-octylbenzaldehyde, 4-nonylbenzaldehyde, 4-ethylbenzenesulfonic acid, 2-octylbenzoic acid, 4-hexyloxy aniline, 4-nonyloxypyridine, 4-hexyl-2-chloro aniline, 4-ethoxy-2-chloroaniline, 4-nonyloxyaniline, 4-decylbenzoic acid, 4-oleylaniline and 4-stearylaniline, mixtures thereof, or combinations thereof.

11. The system of claim 1, wherein the one or more antifouling agents comprises a non-tin-containing, water-insoluble, organo or inorganic compound selected from the group consisting of heterocyclic compounds, aromatic compounds substituted with heteroatom substitutents, amino compounds, carbocyclic vinyl ether ketones, phospho compounds, polychlorinated carbocyclic and acyclic compounds, chlorinated carbocyclic carboxylates, copper (cupric) oleate, alkyl dimethyl benzene, 2,4-d,.alpha.-chlorocrotyl ester, 2,3-dichloro-2-methylpropionic acid sodium salt, diphenylacetronitrile, n-dodecyl thiocyanate, ethyl-N,N-dipropylthiolcarbamate, ethyl-N,N-diisobutyl thiolcarbamate, ethylenebis(dithiocarbamato) zinc, ferric dimethyl-dithiocarbamate, isobornyl thiocyanoacetate, manganese ethylenebisdithiocarbamate, disodium ethylene bisdithiocarbamate, s-propylbutylethylthiocarbamate, piperonyl-bis(2-[2'-n-butoxyethoxy]ethyl)acetal, piperonyl butoxide alpha[2-(2-n-butoxyethoxy)-ethoxy]-4,5-methylenedioxy 2-propyltoluene, piperonyl cyclonen, 3',4'-dichloropropionalide, ethylene-1,2-bis (thiocarbamoyldimethylthiocarbamoyldisulfide), 5,6,7,8-tetrahydro-1-naphthyl methylcarbamate, 2-thiocyanoethyl dodecanoate, tetramethylthiuram disulfide, tert-butyl 4 (or 5)-chloro-2-methylcyclohexanecarboxylate, S-propyldipropylthiocarbamate, zinc ethylene bisdithiocarbamate, zinc dimethyldithiocarbamate, antimony tartrate, antimony potassium tartrate, boric acid, ammonium sulfamate, 4-allyl-2-methoxyphenol, 2,3-dichloro-1,4-napthoquinone, cetylpyridinium, chloride, diphenylamine, 2-chloro-N,N-diallylacetamide, cetyltrimethylammonium bromide, 2-isopropylamino-4-chloro-6-ethylamino triazine, dimethoxythiophosphate derivative of diphenyl sulfide, ethyl 4-chloro-alpha(4-chlorophenyl), alpha-hydroxy benzene acetate methyl, diethylamino, dimethoxythiophosphate derivative of pyrimidine, ethoxylated nonylphenol, unsymmetrical hydrazine derivative of succinic acid, allyl, methylhydroxy substituted cyclopententone ester of dimethylpropenyl cyclopropane carboxylic acid, 2,5-dichloro,3-amino benzoic acid, cinnamic acid, 2-6-dichloro, 4-nitroaniline, dichloro, isopropenyl anilide, dodecylguanidine monoacetate, trichlorophenyl, acetic acid, diphenyl ether, chlorophenyl derivative of the isobutyric acid ester of hydroxylacetonitrile, trihydroxybenzoic acid, 3-indolacetic acid, 3,5-dichloro-N-(3,3-dimethylpropyne)benzamide, napthalene acetamide dimethylethylphenoxy-cyclohexyl-2-propynyl sulfite, o-phenylphenol, phthalic acid, chlorophenyl-isopropyl, propynyl carbamate, N-phenyl, N-butynyl chloroacetamide, amino, chloro, phenyl derivative of azacyclohexamine, N,N-diallyl-2-chloroacetamide, aminoacetic acid derivative of methylphosphonate, 3,5-dinitro, 4-N,N-dipropylamino benzene sulfonamide, 2-chloro-2-propenyl diethylcarbamodithioate, acrolein phenylhydrazone, ammonium saccharinate, 2-allyl-4-hydroxy-3-methyl-2-cyclopenten-1-one ester of 2,2-dimethyl-3-(2-methylpropenyl cyclopropanecarboxylic acid), 4-allyl-2-methoxyphenol o-(allyloxy)phenyl methylcarbamate, 2-(allylthio)-2-thiazoline, 1,2,3,4,7,7-hexachloro-5,6-bis(chloromethyl)-2-norbornene, 4-ethylamino-6-isopropylamino-2-methylthio-1,3,5-triazine, 2-amino-3-chloro-1,4-napthoquinone, 3-amino-5-nitro-o-toluamide, 3-amino-1,2,4-triazole, 2-chloro-4-ethylamino-6-isopropylamino-5-triazine, 4-chloro-m-chlorocarbanilate, 6-chloropiperonyl chrysanthemumate, N-butyl-N-ethyl-.alpha.,.alpha.,.alpha.-trifluoro-2-6-dinitro-p-toluidine-, bis(p-chlorophenyl)-3-pyridine methanol, bis(dialkylphosphinothioyl) disulfide, bis(4-hydroxyiminomethylpyridinum-1-methyl)ether dichloride, 2,4-bis(3-methoxylpropylamino)-6-methylthio-5-triazine bis (pentachloro-2,4-cyclopentadien-1-yl), N-(4-bromo-3-chlorophenyl)-N'-methoxy-N'-methyl urea, 5-(bromomethyl)-1,2,3,4,7,7-hexachloro-2-norbornene, S-(O,O-diisopropyl phosphorodithionate of N-(2-mercaptoethyl)benzenesulfonamide, benzamidooxy-acetic acid, 3-benzylideneamino-4-phenylthiazoline-2-thione, bis(p-chlorophenoxy)methane bis(4-chlorophenyl)disulfide, 1,1-bis(pochlorophenyl)ethane 1,1-bis(p-chlorphenyl)-ethanol, o,o-dimethyl-o-2,5-dichloro-4-bromophenylthionophosphate, O,O-dimethyl-2,2,2-trichloro-1-n-butyryloxyethyl phosphonate, N-butylacetanilide, 2-tert-butylamino-4-chloro-6-ethyl amino-5-triazine, 2-tert-butylamino-4-ethylamino-6-methylmercapto-5-triazine, 4-tert-butyl-2-chlorophenylmethyl methylphosphoramidite, o-(4-tert-butyl-2-chlorophenyl)o-methyl phosphoramidothionate, butyl 3,4-dihydro-2,2-dimethyl-4-oxo-1,2h-pyran-6-carboxylate, n-butyl-9-hydroxyfluorene-(9)-carboxylate, 2-(p-tert-butylphenoxy)cyclohexyl 2-propynyl sulfite, 1-butyn-3-yl m-chlorophenyl-carbamate, N-trichloro-methylthio-4-cyclohexene-1,2-docarboximide, 1-napthtyl n-methylcarbamate, S-[[(p-chlorophenyl)thiol]methyl]O,O-diethylphosphorodithioate, 2-chloro-N,N-diallyl-acetamide, 2-chloroallyl diethyldithiocarbamate, cetyldimethylethylammonium bromide, cetylpyridinium chloride, tetrachloro-p-benzoquinone, 2-chloro-4,6-bis(diethylamino)-s-triazine, p-chlorobenzyl p-chlorophenyl sulfide, 1,2,3,5,6,-7,8,8-octachloro-2,3,3a,4,7,7a-hexahydro-4,7-methanoindene, 1-(3-chlorallyl)-3,5,7-triaza-1-azoniaadamantane chloride, ethyl 4,4'-dichlorobenzylate, 5-chloro-2-benzothiazolethiol zinc salt, p-chlorobenzyl p-fluorophenyl sulfide, 1-chloro-N-(3,4-dichlorophenyl) N,N-dimethylformamidine, 4-chloro-3,5-dimethyl phenoxy-ethanol, 1,4-dichloro-2,5-dimethoxybenzene, 1-(chloro-2-norbornyl)-3,3-dimethylurea, S-(p-chloro-.alpha.-phenylbenzyl) O,O-diethyl phosphorodithioate, p-chlorophenyl ester of benzene-sulfonic acid, N-3-chlorophenyl-1-(isopropyl-carbamoyl-1)-ethyl carbamate, 3-(p-chlorophenyl)-5-methyl rhodanine, 4 (and 6)-chloro-2-phenylphenol sodium salt, p-chlorophenyl phenyl sulfone, 4-chlorophenyl 2,4,5-trichloro-phenylazosulfide, N-(5-chloro-5-thiazolyl) propionamide, 2-[4-chloro-o-tolyl)oxy] propionanilide, 2-chloro-1-(2,4,5-trichloro-phenyl) vinyl dimethyl phosphate, N'-(4-chlorophenoxy)phenyl N,N-dimethylurea, isopropyl N-(3-chlorophenyl)carbamate, copper 8-quinolinolate, 2-(2,4-dihydroxyphenyl)-1-cyclohexene-1-carboxylic acid-lactone O,O-diethylphosphorothioate, 2-chloro-4-dimethylamino-6-methylpyrimidine, 3-(2-cyclopenten-1-yl)-2-methyl-4-oxo-2-cyclopenten-1-yl chrysanthemunate, .alpha.-cyclohexyl-.alpha.-phenyl-3-pyridylmethanol, hydrochloride, N'-cyclo-octyl-N,N-dimethylurea, 4'-dichlorocyclopropanecarboxanilide, 2,4-dichlorophenoxyacetic acid, 3,5-dimethyl-1,3,5,2H-tetrahydrothiadiazine-2-thione, tetra-hydro-3,5-dimethyl-2H-1,3,5-thiadiazine-2-thione, 4-(2,4-dichlorophenoxy)butyric acid, dimethyl 2,3,5,6-tetra-chloroterephthalate, decyltriphenylphosphonium-bromochlorotriphenylstannate, dehydroacetic acid (and its sodium salt), tris and bis(2,4-dichlorophenoxyethyl) phosphate, 2-methyl-thio-4-isopropylamino-6-methylamino-s-triazine, S-2,3-dichloroallyl N,N-diisopropyl thiolcarbamate, 1,3-diaza-2,4-cyclopentadiene, N,N-di-n-butyl-p-chlorobenzene-sulfonamide 3,6-dichloro-o-anisic acid, O-(2-chloro-4-nitrophenyl) O,O-dimethyl phosphorothioate, 2,6-dichlorobenzonitrile, 2,3-dichloro-1,4-naphthoquinone, 1,3-bis(1-hydroxy-2,2,2-trichloroethyl)urea, 3,4-dichlorobenzyl methylcarbamate (80%) mixture with 2,3-dichlorobenzyl methylcarbamate (20%), 1,1-dichloro-2,2-bis(p-ethylphenyl)ethane, 2,4-dichloro-6-(o-chloro-anilino)-s-triazine, N-(dichlorofluoromethylthio)-N'N'-dimethyl-n-phenyl sulfamide, 4,4'-dichloro-N-methylbenzenesulfoanilide, 2,6-dichloro-4-nitroaniline, 2,5-dichloro-3-nitrobenzoic acid, 5,2'-dichloro-4'-nitrosalicylanilide ethanolamine salt, 2',5'-dichloro-4'-nitrososalicylanilide, 2,2'-dihydroxy-5,5'-dichlorophenylmethane, 1-(2,4-dichlorophenoxyacetyl)-3,5-dimethylpyrazole, N-3,4-dichlorophenyl N'-5-chloro-2-(2-sodium sulfonyl-4-chlorophenoxy)phenyl urea, 2,4-dichlorophenyl ester of benzene sulfonic acid, 2,4-dichlorophenyl methanesulfonate, 2,4-dichlorophenyl 4-nitrophenyl ether 4-dichlorotetrahydrothiophene 1,1-dioxide, 4,4'-dichloro-alpha-trichloromethylbenzhydrol, 3',4'-dichloro-2-methacrylanilide (Diethoxyphosphinothioylthio) gamma-butyrolactone, O,O-diethyl s-carboethoxymethyl phosphorothioate, O,O-diethyl O-naphthylamido phosphorothioate, O,O-diethyl O-3,5,6-trichloro-2-pyridyl phosphorothioate, 2,2'-dihydroxy-3,5,3',5',4''-pentachlorotriphenylmethane 2''-sodium sulfonate, O,O-diisopropyl s-diethyldithiocarbamoyl phosphorodithioate, 2,4-dimethylbenzyl 2,2-dimethyl-3-(2-methylpropenyl) cyclopropanecarboxylate, O,O-dimethyl-S-2-(acetylamino)-ethyl dithiophosphate, N-dimethylamino succinamic acid, 1,1-dimethyl-3-[3-(n-tert-butyl-carbamoyloxy)phenyl]urea, O,O-dimethyl s-carboethoxymethyl phosphorothioate, O,O-dimethyl O-(3-chloro-4-nitrophenyl) phosphorothioate, O,O-dimethyl-o-p-cyanophenyl phosphorothioate, o,o-dimethyl-s-[5-ethoxy-1,3,4-thiadiazol-2(3H)-onyl-(3)-methyl] phosphorodithioate, N,N-dimethyl-N'-(2-methyl-4-chlorophenyl)-formamidine hydrochloride, O,O-dimethyl o-(4-nitro-m-tolyl)phosphorothioate, o,s-dimethyl tetrachloro thiotere-phthalate, 4'-dimethyltriazenoacetanilide, dinitrocyclohexylphenol, 2,4'-dinitro-4-trifluoromethyl diphenylether, 2-(1-methyl-n-heptyl)-4,6-dinitrophenyl crotonate, N,N-dimethyl-2,2-diphenylacetamide, diphenylamine, 2,6-dinitro-N,N-di-n-propyl-p-toluidine, di-n-propyl-2,5-pyridine-dicarboxylate, 1,1'-ethylene-2,2'-dipyridinium dibromide, 2,3-dicyano-1,4-dithiaanthraquinone, 3-(3,4-dichlorphenyl)-1,1-dimethyl-urea, n-dodecylguanidine acetate, 2-(2,4,5-trichlorophenoxy)ethyl-2,2-dichloropropionate, ethoxymethylbis(p-chlorophenyl)carbinol, 1,2-dihydro-6-ethoxy-2,2,4-trimethylquinone, 3-phenyl-1,1-dimethylurea trichloroacetate, O,O-dimethyl S-(N-formyl-N-methylcarbamoyl-methyl)phosphorodithioate, 2-formyl-4-chlorophenoxyacetic acid, 3-furfuryl-2-methyl-4-oxo-2-cyclopenten-1-yl chrysanthemunate, 2-heptadecyl-2-imidazoline, 7-chloro-4,6-dimethoxycoumaran-3-one-2-spiro-1'-(2'-methoxy-6'-methylcycl-ohex-2'-en-4'-one), 1,1,1,3,3,3,-hexachloro-2-propanone, 1,5a,6,9,9a,9b-hexahydro-4-a(4H)-dibenzofuran-carboxaldehyde, 9-(p-n-hexyloxyphenyl)-10-methyl-acridinium chloride, 2-hydroxymethyl-4-chloro-phenoxyacetic acid, N-hydroxymethyl-2,6-dichlorothiobenzamide, Isopropyl N-phenylcarbamate, isobutyl triphenylmethylamine, 5-bromo-3-isopropyl-6-methyluracil, isopropyl-4,4'-diboromobenzilate, isopropyl 4,4'-dichlorobenzilate, isorpropyl mercaptophenyl-acetate, O,O-dimethyl phosphorodithioate, 3-cyclohexyl-6,7-dihydro-1H-cyclopentapyrimidine-2,4(3H,5H)-dione, 3-(3,4-dichlorophenyl)-1-methoxy-1-methylurea, S-[1,2-bis(ethoxy-carbonyl)ethyl]O,O-dimethyl phosphorodithioate, 4-chloro-2-methylphenoxyacetic acid, 2-(4-chloro-2-methylphenoxy)propionic acid, sec-butyl 4 (or 5)-chloro-2-methylcyclohexanecarboxylate, s-[(4,6-diamino-s-triazine-2-yl)methyl]O,O-dimethyl phosphorodithioate, 2-isopropylamino-4-(3-methoxypropylamino)-6-methylthio-s-triazine, 1,1,1-trichloro-2,2-bis(p-methoxyphenyl)ethane, 2-methoxy-4-isopropylamino-6-diethylamino-s-triazine, S-(N-methoxymethylcarbamoylmethyl)dimethyl phosphorothiolothiononate, alpha-methylbenzyl 3-(dimethoxy-phosphinyloxy)-cis-crotonate, m-(1-methyl butyl)phenyl methylcarbamate, methyl-2-chloro-9-hydroxyfluorene-(9)-carboxylate, 3,3'-methylenebis(4-hydroxycoumarin), 2,2'-methylenebis(3,4,6-trichlorophenol), 6-methyl-2-oxo-1,3-dithio(4,5-b)quinoxaline, O,O-dimethyl S-(2,5-dichlorophenyl-thio)-methyl phosphorodithioate, 3(2-methylpiperidino)propyl-3,4-dichlorobenzoate, 4-(methylsulfonyl)-2,6-dinitro-n,n-dipropylaniline, methyl-2,3,5,6-tetrachloro-n-methoxy-n-methylterephthalamate, O-methyl O-(2,4,5-trichloro-phenyl)amidophosphorothiomate, 3-(p-bromophenyl)-1-methyl-1-methoxyurea, 1,2-dihydropyridazine-3,6-dione, 3,3'-ethylenebis-(tetrahydro-4,6-dimethyl-2H-1,3,5-thiadiazone-2-thione), S-ethyl hexahydro-1H-azepine-1-carbothioate, 3-(p-chlorphenyl)-1,1-dimethylurea, 3-(p-chlorophenyl)-1,1-dimethylurea trichloroacetate, 1,2-dibromo-2,2-dichloroethyl dimethyl phosphate, beta-naphthoxyacetic acid, 3-(3,4-dichlorophenyl)-1-methyl-1-n-butylurea, 3-(hexahydro-4,7-methanoindan-5-yl)-1,1-dimethylurea, N-1-naphthyl-phthalamic acid, p-chlorophenyl p-phenyl 4-chlorobenzenesulfonate, phenothiazine, ethyl mercaptophenylacetate O,O-dimethylphosphorodithioate, n-phenyl-1-(ethylcarbamoyl-1) ethylcarbamate (d isomer), phosphoric acid, 2-chloro-1-(2,4,5-trichlorophenyl)vinyl dimethyl ester, 4-amino-3,5,6-trichloropicolinic acid, polychlorobenzoic acid, dimethylamine salt, 2,4-bis-(isopropylamino)-6-methoxy-s-triazine, 2-methyl-mercapto-4,6-bis(isopropylamino)-s-triazine, 2-chloro-n-isopropylacetanilide, 2-chloro-4,6-bis(isopropyl-amino)-s-triazine, di-n-propyl-3-methyl-6,7-methylenedioxy-1,2,3,4-tetra-hydronaphthalene-1,-2-dicarboxylate, 5-amino-4-chloro-2-phenyl-3(2H) pyridazinone, pyrethrin 1,8-quinolinol, dimethyl 2,4,5-trichlorophenyl phosphorothionate salicylanilide, 1-(3,4-methylene-dioxyphenoxy)-3,6,9-trioxoundecane, sodium 2-(2,4-dichlorophenoxy)ethyl sulfate, 1-(2-methyl-cyclohexyl)-3-phenylurea, 1-(2,4,5-trichlorophenoxy)propionic acid, N'-chlor-2-methyl-p-valerotoluidide, 1,2-methylenedioxy-4-[2-(octylsulfinyl)propyl]benzene, methyl 3,4-dichlorocarbanilate, 2,4,5-trichlorophenoxyacetic acid, trichlorobenzyl chloride, 2,2-bis(p-chlorophenyl)-1,1-dichloroethane, 3-tert-butyl-5-chloro-6-methyluracil, 2,6-di-tert-butyl-p-tolylmethylcarbamate 2,3,6,7-tetrachloro-4-a,8a-epoxy-1,2,3,4,4a,8a-hexahydro-14-methanonaphth-alene-5,8-dione N-(1,1,2,2-tetrachloro-ethyl-sulfenyl)-cis-4-cyclohexene-1,2-dicarboximid-e, 2,4,5,6-tetrachloroiso-phthalonitrile, 1,2,4,5-tetrachloro-3-nitrobenzene, p-chlorophenyl 2,4,5-trichlorophenyl sulfone, 3,4,5,6-tetrahydrophthalimidomethyl 2,2-dimethyl-3-(2-methylpropenyl)cyclopropanecarboxylate, O,O,O',O'-tetramethyl O,O'-thiodi-p-phenylene phosphorothioate, 1,3,6,8-tetranitrocarbazole, 2-(4-thiazolyl)benzimidazole, 2,2'-thiobis(4,6-dichlorophenol), 2,3-quinoxaline-dithiol cyclic trithiocarbonate, N-meta-tolyl phthalamic acid, S-2,3,3-trichloroallyl N,N-di-isopropylthiol-carbamate, O,O-dimethyl (1-hydroxy-2,2,2-trichloroethyl)phosphonate, 2,3,6-trichlorobenzoic acid, trichlorobenoic acid, dimethylamine salt, 4, 5,7-trichlorobenzthiadiazole-2,1,3,2,3,6-trichlorobenzyloxypropanol, N-trichloromethylthio-benzothiazolone, N-trichloromethylthiobenzoxazolone, 2,2,2-trichloro-n-(pentachloro-phenyl)acetimidoyl chloride, 2-(2,4,5-trichlorophenoxy)ethyl sulfate, sodium salt, N,N'-N"-trichloro-2,4,6-triamine-1,3,5-triazine, 2-chloro-4-(diethylamino)-6-(ethylamino)-s-triazine, 3,5-dinitro-o-toluamide, and mixtures thereof; and having a .OMEGA. value of between about 0.01 and 0.5, a Z parameter for vinyl or aromatic compounds of between about 0.01 and 0.08, and an LD50 value of greater than 200 mg/kg body weight against rats or mice, where % is the weight fraction of heteroatoms contained in the monomer or monomer repeat unit of the anti-fouling agent, Z is the weight fraction of .pi. electrons contained in the monomer or monomer repeat unit of the anti-fouling agent, and LD50 is the lethal oral dose of the anti-fouling agent which is expected to kill 50% of the population of a test group of adult male rats or mice.

12. The system of claim 1, wherein the one or more anti-fouling agents comprises a metal-free organic compound selected from the group consisting of N-trihalomethylthiophthalimides, trihalomethylthiosulphamides, dithiocarbamic acids, N-arylmaleimides, 3-(substituted amino)-1,3 thiazolidine-2,4-diones, dithiocyano compounds, triazine compounds, oxathiazines, 2,4,5,6-tetrachloroisophthalonitrile, N,N-dimethyl-dichlorophenylurea, 4,5-dichloro-2-n-octyl-4-isothiazoline-3-one, N,N-dimethyl-N-phenyl-(N-fluorodichloromethylthio)-sulfamide, tetramethylthiuramdisulphide, 3-iodo-2-propinylbutyl carbamate, 2-(methoxycarbonylamino)benzimidazole, 2,3,5,6-tetrachloro-4-(methylsulphonyl)pyridine, diiodomethyl-p-tolyl sulphone, phenyl(bispyridine)bismuth dichloride, 2-(4-thiazolyl)benzimidazole, dihydroabietyl amine, N-methylol formamide and pyridine triphenylborane, derivatives thereof, mixtures thereof, and combinations thereof.

13. The system of claim 1, wherein the one or more anti-fouling agents comprises 5-chloro-2-(2,4-dichlorophenoxy)phenol, 2-phenylphenol, benzisothiazolinone, bromine monochloride, manganese ethylenebisdithiocarbamate, zinc dimethyl dithiocarbamate, 2-methyl-4-t-butylamino-6-cyclopropylamino-s-triazine, 2,4,5,6-tetrachloroisophthalonitrile, N,N-dimethyl dichlorophenyl urea, zinc ethylenebisdithiocarbamate, copper thiocyanate, copper pyrithione, zinc pyrithione, chlorinated paraffin, 4,5-dichloro-2-n-octyl-3-isothiazolone, N-(fluorodichloromethylthio)-phthalimide, N,N-dimethyl-N'-phenyl-N'-fluorodichloromethylthio-sulfamide, zinc 2-pyridinethiol-1-oxide, tetramethylthiuram disulfide, 2,4,6-trichlorophenylmaleimide, 2,3,5,6-tetrachloro-4-(methylsulfonyl)-pyridine, 3-iodo-2-propynyl butyl carbamate, diiodomethyl p-tolyl sulfone, bis dimethyl dithiocarbamoyl zinc ethylenebisdithiocarbamate, phenyl (bispyridil) bismuth dichloride, 2-(4-thiazolyl)-benzimidazole, pyridine triphenyl borane, phenylamide compounds, pyridazinone compounds, or 2-haloalkoxyaryl-3-isothiazolones, polyhydroxystyrene of the novolak type, (meth)acrylic acid and one or more (meth)acrylate or (meth)acrylamide, menadione triaminotriazine bisulfite(I), menadione (bis) piperazine bisulfite(II), 3-aryl-5,6-dihydro-1,4,2-oxathiazines, 2-arylpyrrole, 3',4'-dichlorodecananilide, 3',5'-dichlorodecanailide, 3',4'-dichloro-3-chloropropaneanilide, N-(3,4-dichlorophenyl)heptanamide, octanilide, N-(3,4-dichlorophenyl)octanamide, N-(3,4-dichlorophenyl)hexanamide, 2-chloro-2',6'-diethyl-N-(methoxymethyl)acetanilide, 1,3-dithiolo(4,5-d)-1,3-dithiino-2-thione compounds, a lipid enzyme coated with 6 to 30 carbon atoms, 4,5-dichloro-2-n-octyl-4-isothiazolin-3-one, 2-n-octyl-4-isothiazolin-3-one, and salts thereof mixed with one or more compounds selected from 5-[2-(2-butoxyethoxy)ethoxymethyl]-6-propyl-1,3-benzodioxole and octachlorodipropyl ether, 4,5-dicyano-1,3-dithiole-2-one containing oxygen or sulfur, 1,2,5-thiadiazolo-1,3-dithiole-2-one, 3,5-dihalogeno-1,2,6-thiadiazin-4-one, hydantoin, phenyloin, dichloro-s-triazinetrione, trichloro-s-triazinetrione, zinc dimethyldithiocarbamate, manganese ethylenebisdithiocarbamate, 2-methylthio-4-t-butylamino-6-cyclopropylamino-s-triazine, 2,4,5,6-tetrachloroisophthalonitrile, N,N-dimethyldichlorophenylurea, 4,5-dichloro-2-n-octyl-3(2H)-isothiazolone, N-(fluorodichloromethylthio)-phthalimide, N,N'-dimethyl-N'-phenyl-(N-fluorodichloromethylthio)sulfamide, 2,4,6-trichlorophenylmaleimide, 2,3,5,6-tetrachloro-4-(methylsulfonyl) pyridine, 3-iodo-2-propenylbutyl carbamate, diiodomethyl-p-tolylsulfone, dimethyldithiocarbamoylzinc ethylenebisdithiocarbamate, phenyl(bispyridine)bismuth dichloride, 2-(4-thiazolyl)benzimidazole, pyridine-triphenylborane, zinc ethylenebisdithiocarbamate, stearylamine-triphenylboron, and laurylamine-triphenylboron, 3-iodo-2-propynyl butyl carbamate, 5-chloro-2-(2,4-dichlorophenoxy)phenol, 3,4,4'-trichlorocarbanilide, 4,5-dichloro-2-n-octyl-4-isothiazolin-3-one, (1'RS,5E)-3-(1'-Bromoethyl)-4-bromo-5-(bromomethylidene)-2(5H)-furanone, (1'RS)-3-(1'-Bromoethyl)-5-(dibromomethylidene)-2(5H)-furanone, (1'RS,5Z)-3-(1'-Bromohexyl)-4-bromo-5-(bromomethylidene)-2(5H)-furanone, (1'RS)-3-(1'-Bromohexyl)-5-(dibromomethylidene)-2(5H)-furanone, 2-n-octyl-3-isothiazolone, 4,5-dichloro-2-n-octyl-3-isothiazolone, 4,5-dichloro-2-benzyl-3-isothiazolone, 2-benzyl-3-isothiazolone, 2-(4-trifluoromethoxyphenyl)-3-isothiazolone, 5-chloro-2-methyl-3-isothiazolone, 2-methyl-3-isothiazolone, 4,5-trimethylene-3-isothiazolone, 2-(4-trifluoromethoxyphenyl)-5-chloro-3-isothiazolone, 2-(4-trifluoromethoxyphenyl)-4,5-dichloro-3-isothiazolone), 2-methyl-4-isothiazolin-3-one, benzisothiazolone, 4,5-dichloro-2-n-octyl-4-isothiazolino-3-one, 5-chloro-2-methyl-4-isothiazolin-3-one, 2-methyl-4-isothiazolin-3-one, penicillin V, penicillin G, ampicillin, cephalosporin, chlortetracycline, neomycin, rifamycin, variotin, manganese ethylenebisdithiocarbamate, zinc dimethylcarbamate, 2-methylthio-4-t-butylamino-6-cyclopropylamino-s-triazine, 2,4,6-tetrachloroisophthalonirile, N,N-dimethyldicholorophenylurea, zinc ethylenebisdithiocarbamate, copper rhodanate, 4,5-dichloro-2-n-octyl-3(2H)-isothiazolone, N-(fluorodichloromethylthio)phthalimide, N,N'-dimethyl-N'-phenyl-(N-fluorodichloromethylthio)sulfamide, 2-pyridinethiol-1-oxide zinc salt, 2-pyridinethiol-1-oxide copper salt, tetramethylthiuram disulfide, 2,4,6-trichlorophenylmaleimide, 2,3,5,6-tetrachloro-4-(methylsulfonyl)pyridine, 3-iodo-2-propylbutyl carbamate, diiodomethyl-p-tolyl sulfone, phenyl(bispyridyl) bismuth dichloride, 2-(4-thiazolyl)-benzimidazole, triphenylboron pyridine salt, surfactants, emulsifiers, derivatives thereof, and mixtures thereof.

14. The system of claim 1, wherein the one or more antifouling agents comprises 8-methyl-N-vanillyl-6-nonenamide, N-(4-Hydroxy-3-methoxybenzyl)-8-methylnonanamide, N-(4-Hydroxy-3-methoxybenzyl)-7-methyloctanamide, N-(4-Hydroxy-3-methoxybenzyl)-9-methyldecanamide, (3E)-N-(4-Hydroxy-3-methoxybenzyl)-9-methyldec-7-enamide, and N-(4-hydroxy-3-methoxybenzyl)nonanamide.

15. The system of claim 1, wherein the one or more antifouling agents comprises an organo-tin compound, organo-copper compound, organo-nickel compound, organo-zinc compound, derivatives thereof, or combinations thereof.

16. The system of claim 1, wherein the one or more antifouling agents comprises an organo-metallic compound selected from the group consisting of bistributyl tin oxide, tributyl tin chloride, tributyl tin fluoride, tributyl tin acetate, tributyl tin nicotinate, tributyl tin versatate, bistributyl tin, triphenyl tin hydroxide, bistriphenyl tin .alpha.,.alpha.'-dibromosuccinate, bistriphenyl tin oxide, bistryphenyl tin monochloromaleinate, copper acetate, oxine copper, copper nonylphenolsulfonate, copper bis(ethylenediamine)-bis (dodecylbenzenesulfonate), copper naphthenate, copper bis (pentachlorophenolate), copper pyrithione, copper naphtenate, nickel acetate, nickel dimethyldithiocarbamate, zinc acetate, zinc carbamate, bis(dimethylcarbamoyl) zinc ethylene-bis(dithiocarbamate), zinc dimethyldithiocarbamate, zinc pyrithione, and zinc ethylene-bis(dithiocarbamate), (polymeric) manganese ethylene his dithiocarbamate complexed with zinc salt (mancozeb), derivatives thereof, mixtures thereof, or combinations thereof.

17. The system of claim 1, wherein the one or more antifouling agents comprises:
a first layer, wherein the first layer comprises a VOC solvent free epoxy resin;
a second layer, wherein the second layer comprises a VOC solvent free epoxy resin binder with thixotropic agents; and
a third layer, wherein the third layer comprises a copper-nickel alloy.

18. The system of claim 1, wherein the one or more antifouling agents comprises polydimethylsiloxane, silicone oil, silicon, carbon fluoride, polytetrafluoroethylene, silicone rubber, room temperature vulcanized silicone rubber, curable organopolysiloxane, curable polyorganosiloxane, polyether polyol, an isocyanate, derivatives thereof, or combinations thereof.

19. The system of claim 1, wherein at least one of the plurality of grooves is formed along at least a portion of a length of the inner surface.

20. The system of claim 1, wherein at least one of the plurality of grooves is formed along at least a portion of a circumference of the inner surface.

21. The system of claim 1, wherein the one or more antifouling agents are disposed within the at least one of the plurality of grooves such that the one or more antifouling agents are not in direct contact with the marine element.

22. A method for reducing vortex-induced vibration and minimizing drag about a marine element, comprising:
disposing a vortex-induced vibration reduction device about a marine element, the vortex-induced vibration reduction device comprising
a rotatable shell having an inner surface defining a plurality of grooves therein and opposing edges defining a longitudinal gap configured to allow the shell to snap around the marine element;
a fin positioned along each opposing edge of the longitudinal gap, each fin extending outwardly from the shell, the fins being positioned on the shell so as to reduce vortex-induced vibration and minimize drag on the marine element; and
one or more antifouling agents disposed within at least one of the plurality of grooves.

23. A method for reducing vortex-induced vibration and minimizing drag about a marine element, comprising:
disposing a vortex-induced vibration reduction device about a marine element, the vortex-induced vibration reduction device comprising:
a U-shaped cylindrical shell with an inner surface defining a plurality of grooves therein and opposing edges defining a longitudinal gap;
parallel fins extending outwardly from the opposing edges of the shell, the parallel fins being positioned so as to reduce vortex-induced vibration and minimize drag on the marine element; and
one or more antifouling agents disposed within at least one of the plurality of grooves.

* * * * *